(12) United States Patent
Li et al.

(10) Patent No.: US 8,897,199 B2
(45) Date of Patent: Nov. 25, 2014

(54) RELAY TRANSMISSION METHOD AND NETWORK NODE

(75) Inventors: Zhongfeng Li, Shanghai (CN); Zheng Shang, Shanghai (CN); Rongting Gu, Shanghai (CN); Wei Jin, Beijing (CN)

(73) Assignee: Huawei Technologies Co., Ltd., Shenzhen P.R. (CN)

( * ) Notice: Subject to any disclaimer, the term of this patent is extended or adjusted under 35 U.S.C. 154(b) by 803 days.

(21) Appl. No.: 13/103,627

(22) Filed: May 9, 2011

(65) Prior Publication Data

US 2011/0216676 A1    Sep. 8, 2011

Related U.S. Application Data

(63) Continuation of application No. PCT/CN2009/075198, filed on Nov. 28, 2009.

(30) Foreign Application Priority Data

Nov. 7, 2008  (CN) .......................... 2008 1 0176058
Apr. 23, 2009  (CN) .......................... 2009 1 0137452

(51) Int. Cl.
| | |
|---|---|
| *H04J 1/10* | (2006.01) |
| *H04W 74/00* | (2009.01) |
| *H04L 1/18* | (2006.01) |
| *H04B 7/155* | (2006.01) |
| *H04B 7/26* | (2006.01) |
| *H04L 1/00* | (2006.01) |
| *H04W 84/04* | (2009.01) |

(52) U.S. Cl.
CPC ........... *H04W 74/002* (2013.01); *H04L 1/1812* (2013.01); *H04B 7/15542* (2013.01); *H04B 7/2606* (2013.01); *H04L 2001/0097* (2013.01); *H04W 84/047* (2013.01)
USPC .......................................... 370/315; 370/329

(58) Field of Classification Search
CPC ............ H04W 72/044; H04W 74/002; H04W 84/047
USPC ........................................... 370/315, 329, 338
See application file for complete search history.

(56) References Cited

U.S. PATENT DOCUMENTS

| | | |
|---|---|---|
| 2006/0000697 A1 | 1/2006 | Houck et al. |
| 2008/0075094 A1 | 3/2008 | Ahn et al. |

(Continued)

FOREIGN PATENT DOCUMENTS

| | | |
|---|---|---|
| CN | 101166055 A | 4/2008 |
| CN | 101282155 A | 10/2008 |

(Continued)

OTHER PUBLICATIONS

Extended European Search Report issued in corresponding European Patent Application No. 09824435.3, mailed Oct. 26, 2011.

(Continued)

*Primary Examiner* — Kan Yuen
(74) *Attorney, Agent, or Firm* — Brinks Gilson & Lione

(57) ABSTRACT

A relay transmission method and a network node are disclosed. The method includes: receiving configuration information about a relay link subframe, the relay link subframe is configured in subframes in a period equivalent to an integer multiple of one frame, where the relay link subframe takes on a specific HARQ timeline; and performing relay link transmission according to the relay link subframe. The relay transmission method put forward herein meets various constraint conditions of the LTE FDD system in the relay transmission performed according to the selected relay link subframe, and is backward-compatible with the UE in the existing LTE system.

18 Claims, 10 Drawing Sheets

(56) References Cited

U.S. PATENT DOCUMENTS

| | | | |
|---|---|---|---|
| 2009/0046650 A1* | 2/2009 | Dalsgaard et al. | 370/329 |
| 2009/0129317 A1* | 5/2009 | Che et al. | 370/328 |
| 2010/0034135 A1* | 2/2010 | Kim et al. | 370/315 |
| 2010/0210256 A1* | 8/2010 | Shen et al. | 455/422.1 |

FOREIGN PATENT DOCUMENTS

| | | |
|---|---|---|
| EP | 1783966 A2 | 5/2007 |
| EP | 1848165 A2 | 10/2007 |
| JP | 2006246002 A | 9/2006 |
| KR | 20090098628 A | 9/2009 |
| RU | 2205512 C1 | 5/2003 |
| RU | 2005136867 A | 5/2007 |
| RU | 2006132334 A | 3/2008 |
| RU | 2377727 C2 | 3/2012 |
| RU | 2342800 C2 | 5/2012 |
| WO | WO 2007/124339 A1 | 11/2007 |
| WO | WO 2008/049028 A1 | 4/2008 |
| WO | WO 2008044318 A | 4/2008 |
| WO | WO 2008/050425 A1 | 5/2008 |
| WO | WO 2008/106797 A1 | 9/2008 |

OTHER PUBLICATIONS

Written Opinion of the International Search Report issued in corresponding PCT Patent Application No. PCT/CN2009/075198, mailed Mar. 11, 2010.

International Search Report issued in corresponding PCT Patent Application No. PCT/CN2009/075198, mailed Mar. 11, 2010.

Nokia Siemens Networks, "Backward Compatible Implementation of Relaying" 11.5 Study Item on LTE-Advanced, Relaying. 3GPP TSG RAN WG1 Meeting #55, Prague, Czech Republic, Nov. 10-14, 2008. R1-084325.

Qualcomm Europe, "Support of Rel-8 UEs by LTE-A Relays" 3GPP RAN WG1#55 Prague, Czech Republic Nov. 10-14, 2008. X-002579221, R1-084384.

Qualcomm Europe, "Support of Rel-8 UEs by LTE-A Relays", 3GPP RAN WG1#54bis. Prague, Czech Republic, Sep. 29-Oct. 3, 2008. R1-084054.

Qualcomm Europe, "Introduction of Blank Subframe Indication Into SIB2", 3GPP TSG-RAN WG2 #64. Prague, Czech Republic, Nov. 10-14, 2008. R2-08xxxx.

Qualcomm Europe, "Specifying Blank Subframes for Efficient Support of Relays", 3GPP TSG-RAN Meeting #54bis, Draft Change Request. Prague, Czech Republic, Sep. 29-Oct. 3, 2008. 36.213 CR 00xx rev 8.4.0.

Qualcomm Europe, "Specifying Blank Subframes for Efficient Support of Relays", 3GPP TSG-RAN Meeting #54bis, Draft Change Request. Prague, Czech Republic, Sep. 29-Oct. 3, 2008. 36.211 CR 00xx rev 8.4.0.

Qualcomm Europe, "Specifying Blank Subframes for Efficient Support of Relays", 3GPP TSG-RAN WG1 #54bis, Prague, Czech Republic, Sep. 29-Oct. 3, 2008. R1-084053.

Office Action issued in corresponding Japanese Patent Application No. 2011-534997, mailed Mar. 12, 2013.

Ericsson, "Efficient Support of Relays Through MBSFN Subframes" Agenda Item 6.1. TSG-RAN WG1 #55, Prague, Czech Republic, Nov. 10-14, 2008. R1-084357.

Motorola, "Frame Structure and Signaling to Support Relay Operation" Agenda Item 12.6. 3GPP TSG RAN1 #56, Athens, Greece, Feb. 9-13, 2009. R1-090798.

Office Action issued in corresponding Chinese Patent Application No. 200910137452.3, mailed May 22, 2012.

Determination of Allowance issued in corresponding Japanese Patent Application No. 2011-534997, mailed Aug. 6, 2013, 5 pages.

Motorola, "LTE-A Relay support via existing MBSFN signalling (10ms vs. 8 ms periodicity)" Agenda Item 6, 3GPP TSG RAN WG1 Meeting #55. Prague, Czech Republic, Nov. 10-14, 2008, 2 pages.

Qualcomm Europe, "Comparing Relay Support with MBSFN and Blank Subframes" Agenda Item 6, 3GPP TSG RAN WG1 #55 Meeting. Prague, Czech Republic, Nov. 10-14, 2008, 4 pages.

Office Action issued in corresponding Russian Patent Application No. 2011122823, mailed Feb. 4, 2013.

Office Action issued in corresponding Korean Patent Application No. 10-2011-7012038, mailed Oct. 17, 2012.

* cited by examiner

RELAY TRANSMISSION METHOD AND NETWORK NODE

CROSS-REFERENCE TO RELATED APPLICATIONS

This application is a continuation of International Application No. PCT/CN2009/075198, filed on Nov. 28, 2009, which claims priority to Chinese Patent Application No. 200810176058.6, filed on Nov. 7, 2008, and Chinese Patent Application No. 200910137452.3, filed on Apr. 23, 2009, all of which are hereby incorporated by reference in their entireties.

FIELD OF THE INVENTION

The present invention relates to the field of communication technologies, and in particular, to a relay transmission method and a network node.

BACKGROUND OF THE INVENTION

With the progress of society and development of wireless communication technologies, higher requirements are imposed on communication rates and communication quality. Wired transmission meets such requirements to some extent, but wired transmission involves distribution of optical cables or lease of wired resources, which restricts the use of wired transmission. Using a relay for wireless backhaul transmission has attracted immense attention in the industry recently. The relay technology enables extension of cell coverage, enhancement of cell capacity, and equalization of cell throughput.

A frame structure in a Long Term Evolution (LTE) system is measured in frames. Each frame includes 10 subframes, and each subframe is fixed to be 1 ms. While the LTE evolves toward LTE-Advanced (LTE-A), the LTE and the LTE-A networks will coexist in a long period. When applying the relay technology to the LTE-A or LTE, it is required to consider the technical features of the existing LTE system Revision 8 (R8) in order to ensure compatibility with the User Equipment (UE) in the LTE R8 system.

However, the relay transmission performed according to the frame structure put forward in the prior art is unable to be compatible with the UE in the LTE R8 system.

SUMMARY OF THE INVENTION

Embodiments of the present invention provide a relay transmission method and a network node to ensure backward-compatibility with the UE in the existing LTE system.

One aspect of the present invention provides a relay transmission method, including:

receiving configuration information about relay link subframe, wherein the relay link subframe is configured in subframes in a period equivalent to an integer multiple of one frame; and performing relay link transmission according to the configured relay link subframe.

Another aspect of the present invention provides a relay transmission method, including:

performing data transmission according to selected relay link subframe;

reserving a guard period in the selected relay link subframe, where:

length of the guard period is an integer multiple of an LTE sampling interval, and/or the length of the guard period is adjusted according to a signaling by both transmission parties; and the relay link subframe include one or two guard periods, and the guard period is before and/or after resources used by a relay link.

Another aspect of the present invention provides a data transmission method, including:

in an LTE Frequency Division Duplex (FDD) system, selecting specific subframe periodically in a period equivalent to an integer multiple of one frame, where:

the selected specific subframe is used for communication of LTE-A UE, and non-specific subframe in the period is used for communication of LTE-A UE and LTE UE.

Another aspect of the present invention provides a network node, including:

a receiving unit, configured to: receive information about relay link subframe, where the relay link subframe is configured in subframes in a period equivalent to an integer multiple of one frame, where the relay link subframe takes on a specific Hybrid Automatic Repeat Request (HARQ) timeline; and a transmitting unit, configured to perform relay link transmission in the relay link subframe determined according to the relay link subframe information received by the receiving unit.

In the LTE system according to embodiments of the present invention, the relay link subframe is configured in the period equivalent to an integer multiple of one frame, and relay transmission is performed according to the relay link subframe that take on a specific HARQ timeline. The relay transmission method put forward in embodiments of the present invention meets various constraint conditions of the LTE FDD system, and is backward-compatible with the UE in the LTE system.

BRIEF DESCRIPTION OF THE DRAWINGS

To illustrate the technical solution under the present invention more clearly, the accompanying drawings for describing the embodiments of the present invention are introduced briefly below. Apparently, the accompanying drawings in the following description are only some embodiments of the present invention, and persons of ordinary skill in the art can derive other drawings from the accompanying drawings without creative efforts.

FIG. 3 shows options available to relay link subframes in an LTE FDD system according to an embodiment of the present invention;

FIG. 10b is a schematic diagram showing a frame structure with configured relay link subframes according to an embodiment of the present invention;

FIG. 10c is a schematic diagram showing another frame structure with configured relay link subframes according to an embodiment of the present invention;

FIG. 10d is a schematic diagram showing another frame structure with configured relay link subframes according to an embodiment of the present invention;

FIG. 10e is a schematic diagram showing another frame structure with configured relay link subframes according to an embodiment of the present invention;

FIG. 10f is a schematic diagram showing another frame structure with configured relay link subframes according to an embodiment of the present invention;

FIG. 10g is a schematic diagram showing another frame structure with configured relay link subframes according to an embodiment of the present invention;

FIG. 10h is a schematic diagram showing another frame structure with configured relay link subframes according to an embodiment of the present invention;

FIG. 10i is a schematic diagram showing another frame structure with configured relay link subframes according to an embodiment of the present invention;

DETAILED DESCRIPTION OF THE EMBODIMENTS

Figure 1A:
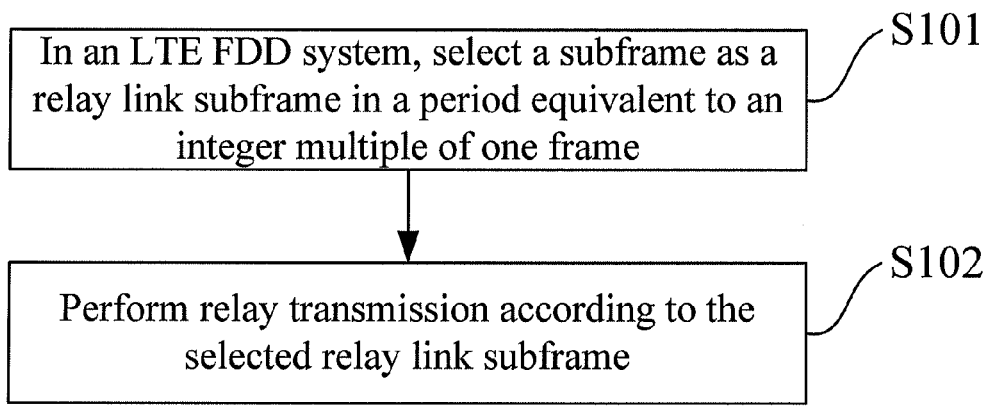
FIG. 1a is a flowchart of a relay transmission method according to an embodiment of the present invention.

The technical solution under the present invention is elaborated below with reference to the accompanying drawings.

In an LTE system, a frame structure needs to meet the following requirements:

(1) Physical Uplink Shared Channel (PUSCH) vs. Physical HARQ Indication Channel (PHICH): The UE sends PUSCH at subframe n, and receives PHICH at subframe n+k accordingly, where k is an ACK/NACK feedback interval, and the ACK/NACK feedback is returned in response to the uplink data. In LTE FDD R8, k is equal to 4. The contents of the PUSCH include at least the uplink data sent by the UE. The content of the PHICH is an Acknowledgement (ACK) or Nonacknowledgement (NACK) returned in response to the data sent by subframe n in the PUSCH.

(2) Uplink (UL) HARQ PUSCH retransmission period: The UE transmits an uplink data block initially on subframe n. If this data block needs to be retransmitted, the retransmission has to be performed on subframe n+k*L, where k is a retransmission period, L is the number of retransmission times, the value of L is 1, 2, 3, . . . Lmax, and Lmax is the maximum number of retransmission times that is configured in the system. In an LTE FDD R8, k is equal to 8.

(3) PHICH/UL grant vs. PUSCH (n+4): If the UE receives a PHICH/UL grant at subframe n, the UE adjusts the uplink data channel PUSCH at subframe n+k as indicated by the PHICH/UL grant, where k is an interval between the PHICH/UL grant indication and the sending of uplink data channel. In an LTE FDD R8, k is equal to 4. The adjustment means: When the content in the PHICH is ACK, new data is sent at the PUSCH on subframe n+4; when the content in the PHICH is NACK, the previously sent data is retransmitted at the PUSCH on subframe n+4; or the data is sent on the corresponding uplink resource on subframe n+4 as indicated by the UL grant.

(4) Physical Downlink Shared Channel (PDSCH) vs. UL ACK/NACK: The UE receives, at subframe n, the data channel PDSCH sent to the UE, and returns an UL ACK/NACK at subframe n+k, where k is an ACK/NACK feedback interval, and the ACK/NACK feedback is returned in response to the downlink data. In an LTE FDD R8, k is equal to 4.

(5) Fixed positions of Primary/Dynamic Broadcast Channel (P/D-BCH) and Primary/Secondary Synchronization Channel (P/S-SCH) subframes: In an LTE FDD system, the P/S-SCH is located in subframe 0 and subframe 5 of every frame, the P-BCH is located in subframe 0 of every frame, the SIB1 in the D-BCH is located in subframe 5 of even-number frames, and the D-BCH is sent in the data channel PDSCH and needs to be sent in the Packet Dedicated Control Channel (PDCCH) and the Physical Control Format Indication Channel (PCFICH) at the same time.

(6) Positions of a paging message: The system configures the positions of the paging message sent to the UE. In an LTE FDD system, when Ns=1, the paging message is transmitted in Downlink (DL) subframe 9; when Ns=2, the paging message is transmitted in DL subframes {4, 9}; when Ns=4, the paging message is transmitted in DL subframes {0, 4, 5, 9}, where Ns is the number of paging message occurring in every frame, and is related to the Discontinuous Reception (DRX) period. The Ns is configured by the system and broadcast to the UE. The paging message is transmitted in the PDSCH, and also need to be transmitted in the control channels PDCCH and PCFICH at the same time.

For ease of description, the related terms and definitions are given below:

HARQ retransmission interval: interval between initial transmission of a data block and first retransmission of the data block, or, interval between two adjacent retransmissions.

Relay link: a link between a Relay Node (RN) and a base station.

Relay link subframe: resource for relay link transmission, for example, subframe where the time-frequency resource is located.

A relay transmission method is disclosed in an embodiment of the present invention. As shown in FIG. 1a, the method includes:

Step S101: In an LTE FDD system, select a subframe in a period as a relay link subframe periodically, the period is equivalent to an integer multiple of one frame. This period includes a basic pattern or combination of multiple basic patterns. The basic pattern is a group of UL subframes and DL subframes. The interval of the UL subframes is an LTE UL HARQ retransmission period, or a multiple of the LTE UL HARQ retransmission period.

In an embodiment of the present invention, some DL subframes meet the LTE HARQ timeline relation, and they are PHICH and UL grant subframes corresponding to the UL HARQ; or, the interval of DL subframes is the interval of UL subframes; or, the DL subframes and the UL subframes adopt an asynchronous LTE HARQ timeline relation; or, the UL grant information and the PHICH feedback information for multiple UL subframes are sent on a specific DL subframe.

In a basic pattern mentioned above, the RN uses at most one DL subframe to send data to the UE served by the RN in the DL direction in every frame, and it is required to return UL ACK/NACK of the data. The DL subframe may be DL subframe 0, DL subframe 4, DL subframe 5 or DL subframe 9.

In a basic pattern mentioned above, the RN uses at most one DL subframe to send data to the UE served by the RN in the DL direction in every frame, and it is not required to return UL ACK/NACK of the data. The DL subframe may be DL subframe 0, DL subframe 4, DL subframe 5 or DL subframe 9.

When the RN sends data in DL subframe 0, DL subframe 4, DL subframe 5 or DL subframe 9, the RN does not send UL grant and PHICH, but sends the reference signal and other control channels in the PDCCH, and sends PCFICH.

In another embodiment of the present invention, all DL subframes meet the LTE HARQ timeline relation, namely, they are PHICH subframes and UL grant subframes corresponding to the UL HARQ. Moreover, a specific part of the DL subframes is used for the relay link; or, the interval of such DL subframes is the interval of the UL subframes.

In a basic pattern or a combination of multiple basic patterns, at most one DL subframe (subframe 0) in the DL direction in each frame is not sent to the data channel PDSCH or its control channels PCFICH and PDCCH.

In DL subframe 0, the RN sends Broadcast Channel (BCH), Synchronization Channel (SCH) and the reference signal to the UE served by the RN. An evolved Node B (eNB) may send PCFICH, PHICH, UL grant, and the reference signal to the RN through the first 1 to 3 symbols of DL subframe 0. Time-frequency resource occupied by the reference signal sent by the RN to the UE served by the RN is different from time-frequency resource occupied by the reference signal sent by the eNB to the RN.

S102: Perform relay transmission according to the selected relay link subframe.

The retransmission period is the same or varies with each UL HARQ process of the RN in the relay link subframes and the LTE UL HARQ process.

In the foregoing relay transmission method, in an LTE FDD system, relay link subframe is selected in the period equivalent to an integer multiple of one frame, and relay transmission is performed according to the relay link subframes. The relay transmission method put forward in an embodiment of the present invention meets various constraint conditions of the LTE FDD system, and is backward-compatible with the UE in the LTE R8 system.

Figure 1B:
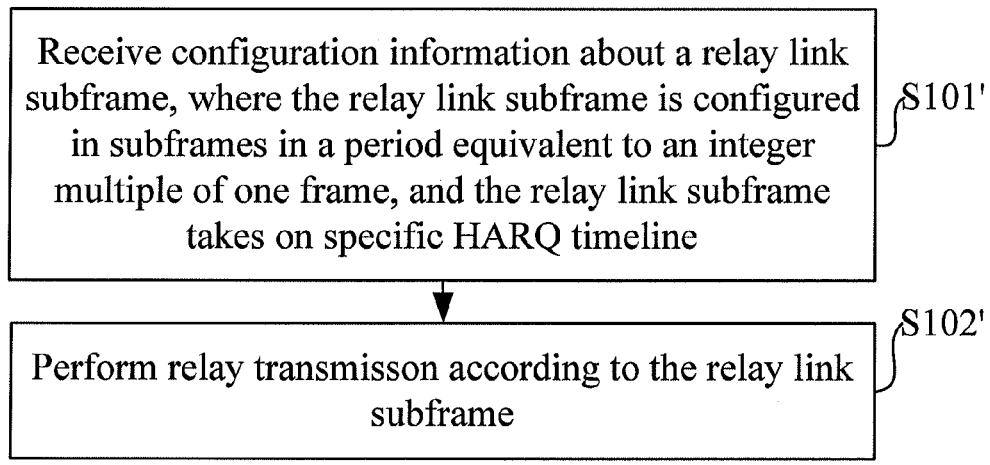
FIG. 1b is a flowchart of a relay transmission method according to another embodiment of the present invention.

A relay transmission method is provided in another embodiment of the present invention. As shown in FIG. 1b, the method includes the following steps:

S101': Receive configuration information about a relay link subframe, where the relay link subframe is configured in subframes in a period equivalent to an integer multiple of one frame, and the relay link subframe takes on a specific HARQ timeline.

S102': Perform relay link transmission according to the relay link subframe.

That is, transmission between the eNB and the RN, and/or transmission between the eNB and the UE is performed on the relay link subframe. Transmission between the eNB and the UE, and/or transmission between the RN and the UE is performed on the non-relay link subframe.

In the method provided in this embodiment, relay transmission is performed according to the configured relay link subframe. The relay link subframe is configured in subframes in the period equivalent to an integer multiple of one frame, and the configuration includes configuration of the downlink relay link subframe and/or configuration of the uplink relay link subframe. The relay link subframe takes on a specific HARQ timeline, and is backward-compatible with the UE in the existing LTE system and accomplishes relay transmission.

Figure 2:
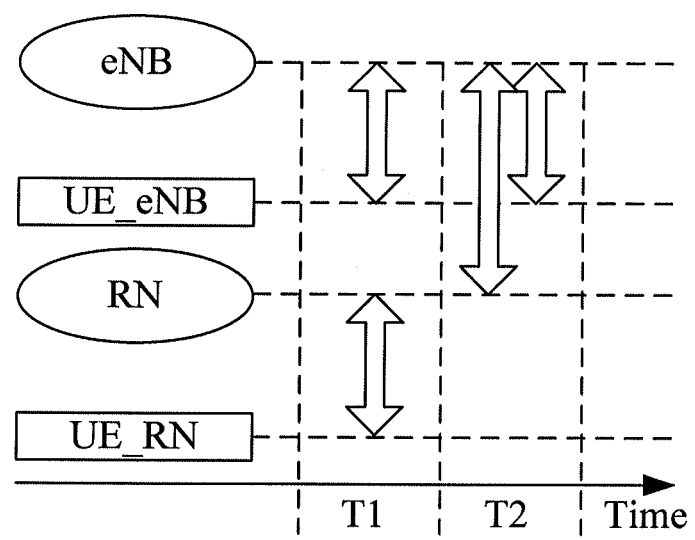
FIG. 2 is a schematic diagram showing a relay transmission mode according to an embodiment of the present invention.

FIG. 2 is a schematic diagram showing a relay transmission mode according to an embodiment of the present invention. Orderly communication is performed between the network nodes such as eNB, UE_eNB (the UE served by the eNB), RN, and UE_RN (the UE served by the RN) according to the method shown in FIG. 2. In FIG. 2, communication is performed between eNB and UE_eNB, and between RN and UE_RN simultaneously in T1; communication is performed between eNB and RN in T2, and communication may be performed between eNB and UE_eNB at the same time. T1 and T2 are subframes in the LTE system, and T2 is a relay link subframe.

No communication is performed between RN and UE_RN on the relay link subframe. Therefore, in order to ensure backward-compatibility with the UE in the LTE R8 system, the selection of the relay link subframe needs to avoid impact on normal communication of the UE_RN.

In an embodiment of the present invention, a method of selecting the relay link subframes according to the foregoing requirements is put forward first, and two types of special processing are performed on the DL subframes {0, 4, 5, 9}, and finally, a relay transmission method that ensures backward-compatibility in an LTE FDD system is put forward.

Figure 3:
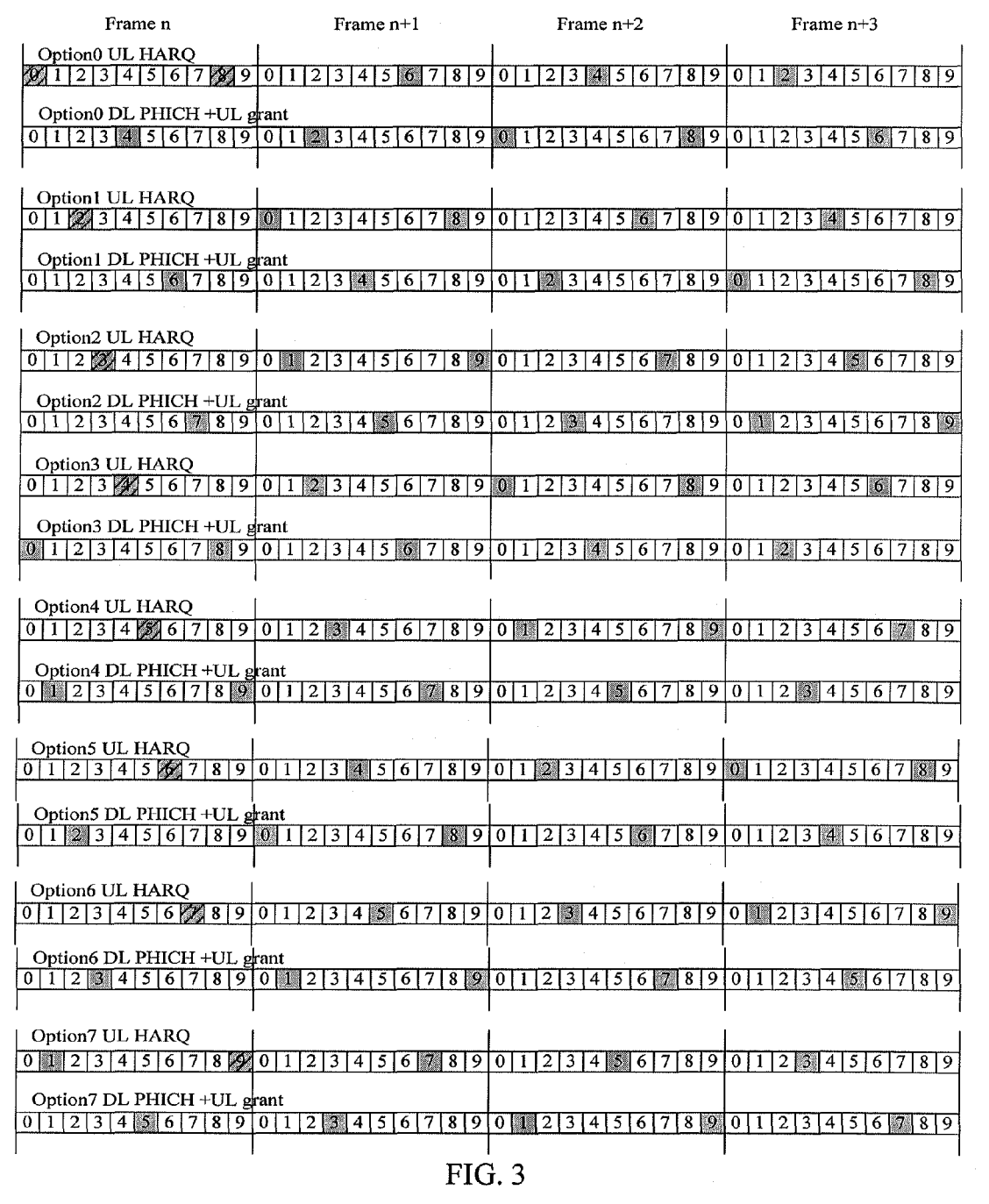

A method of selecting relay link subframes is described below. FIG. 3 shows options available to relay link subframes in an LTE FDD system according to an embodiment of the present invention. Relay link subframes may be selected in this way: First, in frame nf (nf represents a frame number), select UL subframe n available to relay link, and therefore, all subsequent UL subframes $(n+k*\gamma)$ are available to the UL relay link; and then, according to the LTE HARQ timeline relation, select the DL subframes corresponding to the UL relay link subframes for the DL relay link. It is assumed that Nf is the number of subframes in a frame. In an LTE system, Nf is equal to 10, where n may be 0, 1, 2, ..., Nf−1. $\gamma$ is an UL HARQ retransmission period. In an LTE system, $\gamma$ is equal to 8. k is the number of retransmission times, and may be a natural number such as 1, 2, and 3. As regards UL subframe $(n+k*\gamma)$, $(n+k*\gamma)$mod Nf is the subframe number of the UL subframes, and nf+floor$((n+k*\gamma)/Nf)$ is the frame number of the frame that includes the UL subframes.

Taking option 0 as an example, at frame nf, UL subframe 0 is selected as a subframe available to the UL relay link. Therefore, all subsequent UL subframe 8 (@frame nf), UL subframe 6 (@frame nf+1), UL subframe 4 (@frame nf+2), and UL subframe 2 (@frame nf+3) are available to the UL relay link. As regards UL subframe 8 (@frame nf), it is necessary to send UL grant at DL subframe 4 (@frame nf) and send PHICH (return an ACK/NACK) at DL subframe 2 (@frame nf+1). Likewise, as regards UL subframe 6

(@frame nf+1), DL subframe 2 (@frame nf+1) and DL subframe 0 (@frame nf+2) are required. By analogy, the subframes available to the UL/DL relay links are obtained, as shown in option 0 in FIG. 3.

As shown in FIG. 3, each value of n corresponds to an option. In each option, the subframes available to the UL/DL relay link are somewhat periodic. That is, the UL/DL relay link subframe selected in frame nf is completely the same as the UL/DL relay link subframe selected in frame nf+p, where p=floor((n+λ)/Nf). λ is the minimum common multiple of γ and Nf. In the LTE FDD, p=4. As shown in FIG. 3, each frame repeats itself at interval of 4 frames. For example, the relay link subframe selected in frame nf is a duplicate of the relay link subframe selected in frame nf+4.

In the case that the relay link subframe is selected periodically in a period equivalent to one frame or an integer multiple of the frame, if the relay link subframe selected by option x is exactly the same as the relay link subframe selected by option y, option x is equivalent to option y. The option corresponding to n=0 is equivalent to the option corresponding to n=8; the option corresponding to n=1 is equivalent to the option corresponding to n=9. Therefore, there are a total of 8 independent options, namely, option 0, option 1, . . . , option 7, as shown in FIG. 3. The 8 options traverse all subframes in the period.

For each option, in the UL direction, the interval of every 2 continuous subframes for UL relay link is 8 subframes, which meets the retransmission period of the UL HARQ, i.e., 8 subframes; in the DL direction, the HARQ timeline (PHICH and UL grant) corresponding to the subframes for UL relay links is met. Therefore, the communication between UE_RN and RN can be performed on all remaining subframes, and the communication between UE_RN and RN still meets the existing LTE HARQ timeline constraint, thus ensuring backward compatibility.

In option 0, as for UE_RN, if communication with the RN is performed on UL subframe 6 (@frame nf), retransmission is performed on UL subframe 4 (@frame nf+1), UL subframe 2 (@frame nf+2), and UL subframe 0 (@frame nf+3). The retransmission interval is 8 subframes. Moreover, DL subframe 2 (@frame nf), DL subframe 0 (@frame nf+1), DL subframe 8 (@frame nf+2), and DL subframe 6 (@frame nf+3) are required. None of such subframes is used for relay link. Therefore, the communication between UE_RN and RN is not affected, and the backward compatibility is ensured.

Special processing for certain DL subframes is described below.

On DL subframes {0, 4, 5, 9}, some necessary operations need to be performed from RN to UE_RN, and from eNB to UE_eNB, for example, P/S-SCH, P/D-BCH, and paging. If the DL relay link also needs to use such subframes, special processing is required.

In an embodiment of the present invention, the RN either communicates with the eNB or communicates with the UE_RN, but is unable to communicate with both eNB and UE_RN simultaneously. That is, at any time, the relay link eNB↔N and the access link RN↔UE_RN do not exist simultaneously.

The first method of special processing for certain DL subframes according to an embodiment of the present invention is described below.

TABLE 1

| UL | Subframe n − 4 | Subframe n + 4 | |
|---|---|---|---|
| | | Case 1 | Case 2 |
| Relay link RN->eNB | ○ | X | ○ |
| Access link UE_RN->RN | X | ○ | X |

| DL | Subframe n | | Subframe n + 8 |
|---|---|---|---|
| | Case 1 | Case 2 | |
| Relay link eNB->RN | X | X | ○ |
| Access link RN->UE_RN | The PDSCH includes not only the data of necessary operations, but also the data sent to the UE_RN, namely, sent to the channels PCFICH, PDSCH, and PDCCH | The PDSCH includes only the data of necessary operations, and does not include data sent to the UE_RN | X |

Note
X means that the link is disabled; and
○ means that the link is enabled.

As shown in Table 1, UL subframes {n−4, n+4} and DL subframes {n, n+8} are selected according to the relay link subframe selection method shown in FIG. 3, and are used as relay subframes of the UL/DL relay link; on DL subframe n, necessary operations stipulated in the LTE system occur on the RN->UE_RN link, and therefore, the first processing method is that: The RN->UE_RN link is not only available for performing such necessary operations, but also available for sending PDSCH normally and the corresponding configuration information such as PDCCH and PCFICH. The first processing method M1 comes in two cases:

Case 1: On DL subframe n, the PDSCH of the RN->UE_RN link includes the data sent to the UE_RN, and therefore, the UE needs to send an UL ACK/NACK on UL subframe n+4. In this case, the UL subframe n+4 is not applicable to the relay link.

Case 2: On DL subframe n, the PDSCH of the RN->UE_RN link does not include data sent to the UE_RN, and therefore, the UE_RN does not need to send any UL ACK/NACK on UL subframe n+4. In this case, the UL subframe n+4 is applicable to the relay link. Therefore, case 2 ensures availability of the relay link in UL subframe n+4.

Besides, as regards the access link RN↔UE_RN, because the access link of UL subframe n−4 is disabled, the RN does not need to send the PHICH on the access link of DL subframe n. Moreover, on the access link of DL subframe n, the RN does not send UL grant, and therefore, the UE_RN does not send data (PUSCH) on UL subframe n+4. That is, on the access link of DL subframe n+8, the RN does not need to send PHICH, thus ensuring availability of the relay link on DL subframe n+8. If the DL subframe n+8 is configured as Multicast Broadcast Single Frequency Network (MBSFN) subframe, it is allowed to send the UL data on UL subframe n+4, and the corresponding ACK/NACK is returned on DL subframe n+8. The UL grant is sent on DL subframe n. In this case, the non-unicast service part of the MBSFN subframe n+8 is available to the relay link, and the availability of the relay link is still ensured on this subframe.

Table 1 reveals that in case 1 of the first processing method, UL subframe n−4 and DL subframe n+8 are available to the relay link; in case 2, UL subframes {n−4, n+4} and DL subframe n+8 are available to the relay link. Evidently, the relay link eNB↔RN is not compliant with the HARQ timeline of the LTE FDD, but the HARQ timeline may be designed flexibly according to the characteristics of the relay link. That is, the feedback timeline of the UL/DL HARQ is re-designed, and the timeline relation of the interval between UL grant and the UL retransmission is re-designed according to the available relay link subframes. For example, the timeline similar to LTE TDD HARQ is applied. Table 2 shows a timeline of HARQ within the period of frames [nf, nf+p]. The timeline of HARQ in other periods is similar.

In Table 2, for case 1 of the first processing method, the PHICH sent on DL subframe n+8 on the relay link is an ACK/NACK feedback of the PUSCH sent by the RN to the eNB on UL subframe n−4. Moreover, on UL subframe n−4, the interval to the next UL retransmission is 16 subframes; on all other UL subframes, the interval is 8 subframes. Therefore, the UL retransmission period changes to some extent. Therefore, in an embodiment of the present invention, the UL retransmission is in an asynchronous mode. That is, the eNB needs to send a notification on DL subframe n+8 of every period equivalent to frames [nf, nf+p]. The notification tells that the retransmission location is UL subframe n+12. Afterward, the retransmission interval is 8 subframes by default.

In Table 2, as regards case 2 of the first processing method, the PHICH sent on DL subframe n+8 on the relay link includes an ACK/NACK feedback of the data on UL subframes {n−4, n+4}; likewise, the UL grant sent on DL subframe n+8 on the relay link includes scheduling information for UL subframes {n−4, n+4}; and the remaining subframes still comply with the HARQ timeline of the LTE FDD, namely, in case 2 of the first processing method, it is necessary to send UL grant information and PHICH feedback information for multiple UL relay link subframes on some downlink relay link subframes. Moreover, the UL retransmission period is 8 ms or 16 ms, and needs to be notified in an asynchronous mode or is pre-stored.

The first processing method is applicable to processing of all DL subframes. The following description takes DL subframes {0, 4, 5, 9} as an example. Table 3 gives the details:

TABLE 2

|  |  | DL n − 16 | UL n − 12 | DL n − 8 | UL n − 4 | DL n | UL n + 4 | DL n + 8 | UL n + 12 | DL n + 16 | UL n + 20 |
|---|---|---|---|---|---|---|---|---|---|---|---|
|  | Subframe 4UL:4DL |  |  |  |  |  |  |  |  |  |  |
| M1-case 1 Relay link HARQ | state for relay link | ○ | ○ | ○ | ○ | X | X | ○ | ○ | ○ | ○ |
|  | PDSCH VS.UL ACK/NACK | 4 |  | 4 |  | — | — | 4 |  | 4 |  |
|  | PUSCH VS.UL grant | G3 | Process 3 | G4 | Process 4 | — | — | G1 | Process 1 | G2 | Process 2 |
|  | PUSCH VS. PHICH | P2 | Process 3 | P3 | Process 4 | — | — | P4 | Process 1 | P1 | Process 2 |
|  | UL retransmission interval |  | 8 |  | 16 |  | — |  | 8 |  | 8 |
|  | Subframe 5UL:4DL |  |  |  |  |  |  |  |  |  |  |
| M1-case 2 Relay link HARQ | state for relay link | ○ | ○ | ○ | ○ | X | ○ | ○ | ○ | ○ | ○ |
|  | PDSCH VS.UL ACK/NACK | 4 |  | 4 |  | — |  | 4 |  | 4 |  |
|  | PUSCH VS.UL grant | G3 | Process 3 | G45 | Process 4 | — | Process 5 | G1 | Process 1 | G2 | Process 2 |
|  | PUSCH VS. PHICH | P2 | Process 3 | P3 | Process 4 | — | Process 5 | P45 | Process 1 | P1 | Process 2 |
|  | UL retransmission interval |  | 8 |  | 16 |  | 8 |  | 8 |  | 8 |

Note
— represents non-existence;
○ represents availability;
X represents disabling;
G represents grant; and
P represents PHICH;
[DL n − 16, UL n + 20] represents all UL/DL relay link subframes in the period of frame [nf, nf + p];
Necessary operations stipulated in the system occur on the access link RN↔UE_RN of DL subframe n.

TABLE 3

| First processing method | Applicable to DL subframe n | DL subframe n access link RN->UE_RN | UL subframe n + 4 access link UE_RN->RN |
|---|---|---|---|
| Case 1 | 0 | P/S-SCH, P-BCH, reference signal; PCFICH, PDSCH (including data), PDCCH | PUCCH(UL ACK/NACK); PUSCH |
|  | 5 | P/S-SCH, reference signal; PCFICH, PDSCH (including data, D-BCH, paging), PDCCH | PUCCH (UL ACK/NACK); PUSCH |
|  | 4 or 9 | PCFICH, reference signal; PDSCH (including data, paging) PDCCH | PUCCH(UL ACK/NACK); PUSCH |
| Case 2 | 0 | P/S-SCH, P-BCH, reference signal; PCFICH, PDSCH (not including data), PDCCH (not including PHICH or UL grant) | — |
|  | 5 | P/S-SCH, reference signal; PCFICH, PDSCH (not including data, including D-BCH, paging) PDCCH (not including PHICH or UL grant) | — |
|  | 4 or 9 | PCFICH, reference signal; PDSCH (not including data, including paging), PDCCH (not including PHICH or UL grant) | — |

The second method of special processing for certain DL subframes in an embodiment of the present invention is described below.

Unlike the first processing method, the second processing method sets this requirement: On DL subframe 0, no operation other than the necessary operations is performed on the RN->UE_RN link, namely, no PDSCH or related PDCCH or PCFICH configuration information is sent on the RN->UE_RN link. Therefore, the second processing method is applicable only to DL subframe 0, as detailed in Table 4.

TABLE 4

| UL | Subframe 6@ frame nf − 1 | subframe 4@ frame nf |
|---|---|---|
| Relay link RN->eNB | ○ | ○ (send PUSCH, not send UL ACK/NACK) |
| Access link UE_RN->RN | X | X |

| DL | subframe 0@ frame nf | subframe 8@ frame nf |
|---|---|---|
| Relay link eNB->RN | ○ (Send PCFICH, PHICH, UL grant, and reference signal only) | ○ |
| Access link RN->UE_RN | Perform no operation other than the necessary operations, namely, send P/S-SCH, P-BCH, and reference signal only | X |

Note
X means that the link is disabled; and
○ means that the link is enabled.

Table 4 reveals that the second processing method divides DL subframe 0. The first few Orthogonal Frequency Division Multiplexing (OFDM) symbols are designed for sending PCFICH, PHICH, UL grant, and reference signal on the relay link eNB->RN. In this case, the RN is in the receiving state. The subsequent symbols are designed for performing necessary operations and sending P/S-SCH, P-BCH, and reference signal on the access link RN->UE_RN. In this case, the RN is in the sending state, namely, DL subframe 0 is partially designed for the relay link, and is partially designed for the access link. Moreover, an embodiment of the present invention sets this constraint: The relay link eNB->RN does not send data or its related configuration information on the DL subframe, which prevents the RN from receiving or transmitting data simultaneously. According to the LTE FDD constraint condition (4), it is not necessary to send UL ACK/NACK on the relay link RN->eNB of UL subframe 4.

Table 4 reveals that UL Subframe 6@ frame nf-1 (indicating subframe 6 in a frame numbered nf-1), UL subframe 4@ frame nf, DL subframe 0@ frame nf, and DL subframe 8@ frame nf are all applicable to the relay link. The second processing method ensures that the relay link meets the timeline of the LTE FDD HARQ, namely, the timeline relations of the UL retransmission period, UL grant in the UL data, PHICH feedback, and UL ACK/NACK in the DL data. In this way, after the relay is introduced, little change is made on the existing system, and the complexity of the relay link design is reduced.

In light of the constraint condition (6) of LTE FDD, the options in FIG. 3 are characterized by:

I. Each of options {0, 2, 4, 6} does not include DL subframe 9, but includes DL subframes {0, 4}. Options {0, 2, 4, 6} are abbreviated as Group x.

II. Each of options {1, 3, 5, 7} does not include DL subframe 4, but includes DL subframes {5, 9}. Options {1, 3, 5, 7} are abbreviated as Group y.

In light of the foregoing characteristics and the 6 constraint conditions of the LTE FDD, if Ns=1, the paging message needs to be sent in DL subframe 9, and the options not including DL subframe 9 or a combination of them may be selected for the relay link subframe; or the options obtained after DL subframe 9 is processed in the first processing method, or a combination of them may be selected for the relay link subframe; or a combination of the options obtained after such processing and the options not including DL subframe 9 may be selected for the relay link subframe. As regards Ns=2 or 4, the paging message needs to be sent in DL subframes {4, 9}, or DL subframes {0, 4, 5, 9}. However, each option in FIG. 3 either includes DL subframe 4 or includes DL subframe 9. Therefore, the first processing method needs to be applied to process DL subframes {4, 9} respectively, and a combination of the options obtained after such processing may be selected for the relay link. Table 5 shows a method of selecting relay link subframes in an embodiment of the present invention.

TABLE 5

| Ns | Selection of relay link subframes |
|---|---|
| 1 | Select any option in Group x or a combination of any options in Group x; or select any options obtained after DL subframe 9 is processed in the first processing method in Group y, or a combination of them; or select a combination of the options obtained after DL subframe 9 is processed in the first processing method in Group y and the options in Group x |
| 2 or 4 | Select options obtained after DL subframe 9 is processed in the first processing method in Group y, or a combination of them; or select options obtained after DL subframe 4 is processed in the first processing method in Group x, or a combination of them; or select a combination of the options in Group y and the options in Group x after such processing |

Figure 4A:
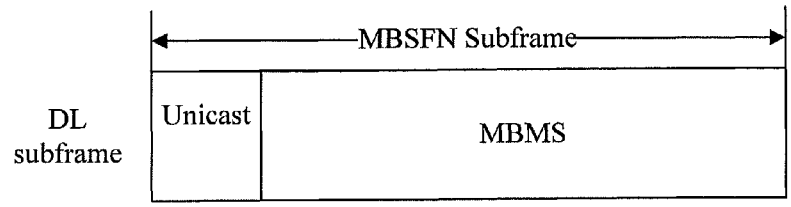
FIG. 4a is a schematic diagram showing an MBSFN subframe in an LTE system according to an embodiment of the present invention.

As shown in FIG. 4a, in the LTE, the MBSFN subframe is a DL subframe, and the first 1 to 2 OFDM symbols of the MBSFN subframe are used for unicast services, and are used for sending data of control channels PCFICH and PHICH, and/or UL Grant, and reference signal.

In selecting relay subframes, the DL relay link may also be located in an MBSFN subframe. In this case, the DL relay link eNB→RN uses the part available to the non-unicast service in the MBSFN subframe for transmission. That is, each subframe configurable as MBSFN can be selected as a DL relay link subframe. In the LTE/LTE-A FDD, all DL subframes except the DL subframes {subframe n| n=0, 4, 5, 9} are configurable as MBSFN subframes, and can be used as DL relay link subframes.

In an embodiment of the present invention, the subframe corresponding to a basic pattern or a combination of basic patterns is selected as relay link subframe periodically in a period equivalent to an integer multiple of one frame. A basic pattern is characterized by: a group of UL subframes and DL subframes in the period equivalent to an integer multiple of one frame, the group of UL subframes and DL subframes meet a specific HARQ timeline; and/or the UL subframes and DL subframes meet the following relation: The interval between the UL subframes is a UL HARQ retransmission interval or an integer multiple of the UL HARQ retransmission interval; the interval between DL subframes is equal to the interval between UL subframes; the subframe number of the UL subframe=(subframe number of the DL subframe+offset k)mod M, where M is the total number of DL/UL subframes in a period equivalent to an integer multiple of one frame, offset k is a natural number, and is generally determined by the HARQ timeline used by the relay link. Specifically, k is an ACK/NACK feedback interval of the DL HARQ process of the relay link on the DL subframe, or k is an offset value stipulated by the system, for example, k=4.

Figure 4B:
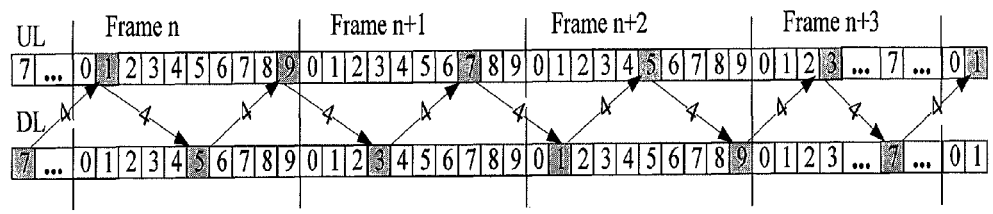
FIG. 4b is a schematic diagram showing a frame structure according to an embodiment of the present invention.

Each option shown in FIG. 3 corresponds to a basic pattern. The basic patterns in FIG. 3 are defined as the first type of basic patterns, namely, Alt1. Alt1 is characterized by: a group of UL subframes and DL subframes in a period equivalent to an integer (e.g., 4) multiple of one frame, meet the Alt1 HARQ timeline. That is, the ACK/NACK feedback interval of the process on the DL subframe is 4 ms, the interval between the UL grant and the UL transmission is 4 ms; the ACK/NACK feedback interval of the process on the UL subframe is 4 ms; and the retransmission period of the UL process is 8 ms. FIG. 4b is an example of a basic pattern in Alt1. In FIG. 4b, the UL/DL subframes corresponding to the grey pattern are a group of UL subframes and DL subframes in a period equivalent to an integer multiple of one frame, and meet the Alt1 HARQ timeline characteristics described above; the DL subframe interval is 8 ms, the UL subframe interval is 8 ms, subframe number of UL subframe=(subframe number of DL subframe+4)mod 40. In a period of 4 frames, the range of the subframe number of UL/DL subframes is 0-39.

Figure 4C:
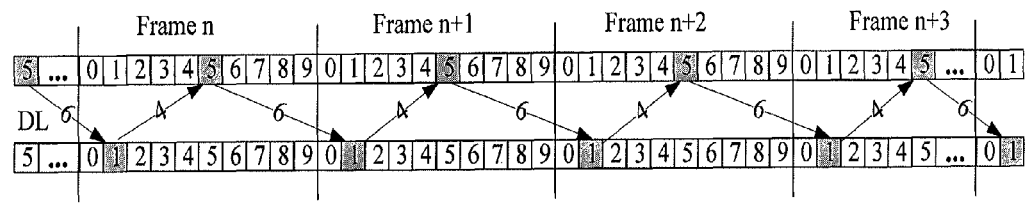
FIG. 4c is a schematic diagram showing a frame structure according to an embodiment of the present invention.

Similarly, the second type of basic patterns is defined as Alt2. Alt2 is characterized by: a group of UL subframes and DL subframes in a period equivalent to an integer multiple of one frame, for example, 1 frame, meet the Alt2 HARQ timeline. That is, the ACK/NACK feedback interval of the process on the DL subframe is 4 ms, the interval between the UL grant and the UL transmission is 4 ms; the ACK/NACK feedback interval of the process on the UL subframe is 6 ms; and the retransmission period of the UL process is 10 ms. The subframes in the Alt2 basic patterns may be expressed as: the subframe number of a DL subframe is i, the subframe number of an UL subframe is j=(i+b)mod M, where M is the number of all DL or UL subframes in a period equivalent to an integer multiple of one frame, for example, M=10; b is an offset between the subframe number of the UL subframe and the subframe number of the DL subframe, for example, b=4; the value of i varies between basic patterns of the second type, and i falls within {1, 2, 3, 6, 7, 8}. FIG. 4c shows an example of a basic pattern in Alt2. In FIG. 4c, the UL/DL subframes corresponding to the grey pattern are a group of UL subframes and DL subframes that repeat themselves every 1 frame in 4 periods, and meet the Alt2 HARQ timeline characteristics described above; the DL subframe interval is 10 ms, the UL subframe interval is 10 ms, subframe number of UL subframe=(subframe number of DL subframe+4)mod 40.

Figure 4D:
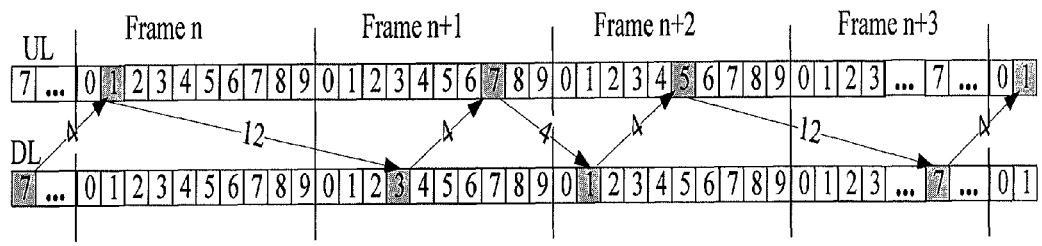
FIG. 4d is a schematic diagram showing a frame structure according to an embodiment of the present invention.

Similarly, the third type of basic patterns is defined as Alt3. Alt3 is characterized by: a group of UL subframes and DL subframes in a period equivalent to an integer (e.g., 4) multiple of one frame, for example, meet the Alt3 HARQ timeline. That is, the ACK/NACK feedback interval of the process on the DL subframe is 4 ms, the interval between the UL grant and the UL transmission is 4 ms; the ACK/NACK feedback interval of the process on the UL subframe is 12 ms or 4 ms; and the retransmission interval of the UL process is 8 ms or an integer multiple of 8 ms. The subframes in the Alt3 basic patterns may be expressed as: the subframe number of a DL subframe is i=(a+k*L)mod M, (i mod N) falls outside a set P, P is a subframe set, for example, P is a set of subframes not configurable as MBSFN subframes in the system, namely, {0, 4, 5, 9}; where M is the number of all DL or UL subframes in a period equivalent to an integer (e.g., 4) multiple of one frame, for example, M=10; M is divisible by L, for example, k=0, 1, 2, 3, 4; a falls within {0, 1, 2, ..., L−1}, and the value of a varies between basic patterns of the third type; the subframe number of an UL subframe in Alt3 basic patterns is j=(i+b)mod M; b is an offset between the subframe number of the UL subframe and the subframe number of the DL subframe, for example, b=4. FIG. 4d shows an example of a basic pattern in Alt3. The subframe number of an UL/DL subframe in a period equivalent to 4 frames ranges from 0 to 39. In FIG. 4d, the UL/DL subframes corresponding to the grey pattern are a group of UL subframes {1, 17, 25} and DL subframes {13, 21, 37} in a period equivalent to 4 frames. They meet the Alt3 HARQ timeline characteristics described above. That is, in frames [n, n+3], the ACK/NACK feedback interval of the process on the DL subframes {13, 21, 37} is 4 ms; the interval between the UL grant and the UL transmission is 4 ms; the ACK/NACK feedback intervals of the process on the UL subframes {1, 17, 25} are 12 ms, 4 ms, and 12 ms, respectively; the retransmission periods of the process on the UL subframes {1, 17, 25} are 16 ms, 8 ms, and 16 ms, respectively. The interval of DL subframes is an integer multiple of 8 ms, the interval of UL subframes is an integer multiple of 8 ms, and the subframe number of an UL subframe=(subframe number of a DL subframe+4)mod 40.

The Alt3 basic patterns are composed of the UL and DL subframes obtained after the DL subframe n and UL subframe n+4 (n=0, 4, 5, 9) are deleted from the A1a basic patterns. Such a processing method is the same as case 1 of the first processing method described above, namely, the DL subframe n and the UL subframe n+4 (n=0, 4, 5, 9) are not used for relay link.

Table 6 describes three types of HARQ timelines mentioned above.

TABLE 6

| Three types of HARQ timelines | PDSCH VS. UL ACK/NACK; PHICH/UL grant VS. PUSCH (ms) | PUSCH VS. PHICH (ms) | UL retransmission period (ms) |
| --- | --- | --- | --- |
| Alt 1 | 4 | 4 | 8 |
| Alt 2 | 4 | 6 | 10 |
| Alt 3 | 4 | 4, 12 | 8, 16 |

In a period equivalent to 4 frames, there are 8 mutually orthogonal basic patterns of the first type, namely, Alt1 option i, i=0, 1, 2, . . . 7; and there are 10 mutually orthogonal basic patterns of the second type, namely, Alt2 option i, i=0, 1, 2, . . . 9; and there are 8 mutually orthogonal basic patterns of the third type, namely, Alt3 option i, i=0, 1, 2, . . . 7. Table 7 gives the details:

multiple of one frame, all basic patterns of Alt3 are mutually complementary to Alt2 option {3, 4, 8, 9}. That is, all basic patterns of Alt3 and the subframes corresponding to the option {3, 4, 8, 9} of the basic patterns of Alt2 make up all UL subframes and DL subframes in a period equivalent to an integer (e.g., 4) multiple of one frame. Another characteristic is that: option m (m=0, 2, 4, 6) in Alt3 is a group of basic patterns that can move rightward cyclically. That is, the subframes included in any of the basic patterns can move rightward by an integer multiple of one frame at the same time, namely, an integer multiple of 10 ms, to obtain the other three basic patterns. Likewise, option m (m=1, 3, 5, 7) is a group of basic patterns that can move rightward cyclically, and any of the basic patterns can move rightward cyclically to obtain the other three basic patterns. In this case, the system needs only to store two basic patterns and can obtain all basic patterns in Alt3, thus occupying less storage space. For example, Alt 3 option 0 moves rightward cyclically to obtain Alt3 option m (m=3, 5, 7); and Alt 3 option 1 moves rightward cyclically to obtain Alt3 option m (m=3, 5, 7). Therefore, the system needs only to store option 0 and option 1 in Alt 3 and can obtain all options in Alt3. For two basic patterns that need to be stored, for example, option 0 and option 1, their storage may be further simplified. That is, the system stores only the subframe number of the DL subframes in the two basic patterns. The UL subframes are obtained according to "subframe number of UL subframe=(subframe number of DL subframe+ offset) mod 40". For example, the system stores only DL subframe number k=12, 28, 36, in option 0 (the DL/UL subframe numbers on the time units of the four frames are 0, 1,

TABLE 7

| | | Alt 1 | | | | | Alt 2 | | | | | Alt 3 | | | |
| --- | --- | --- | --- | --- | --- | --- | --- | --- | --- | --- | --- | --- | --- | --- | --- |
| | option | nf | nf + 1 | nf + 2 | nf + 3 | option | nf | nf + 1 | nf + 2 | nf + 3 | option | nf | nf + 1 | nf + 2 | nf + 3 |
| Group A | 0 UL | 0, 8 | 6 | 4 | 2 | 0 UL | 0 | 0 | 0 | 0 | 0 UL | 0 | 6 | | 2 |
| | DL | 4 | 2 | 0, 8 | 6 | DL | 6 | 6 | 6 | 6 | DL | | 2 | 8 | 6 |
| | 2 UL | 2 | 0, 8 | 6 | 4 | 2 UL | 2 | 2 | 2 | 2 | 2 UL | 2 | 0 | 6 | |
| | DL | 6 | 4 | 2 | 0, 8 | DL | 8 | 8 | 8 | 8 | DL | 6 | | 2 | 8 |
| | 4 UL | 4 | 2 | 0, 8 | 6 | 4 UL | 4 | 4 | 4 | 4 | 4 UL | | 2 | 0 | 6 |
| | DL | 0, 8 | 6 | 4 | 2 | DL | 0 | 0 | 0 | 0 | DL | 8 | 6 | | 2 |
| | 6 UL | 6 | 4 | 2 | 0, 8 | 6 UL | 6 | 6 | 6 | 6 | 6 UL | 6 | | 2 | 0 |
| | DL | 2 | 0, 8 | 6 | 4 | DL | 2 | 2 | 2 | 2 | DL | 2 | 8 | 6 | |
| | | | | | | 8 UL | 8 | 8 | 8 | 8 | | | | | |
| | | | | | | DL | 4 | 4 | 4 | 4 | | | | | |
| Group B | 1 UL | 1, 9 | 7 | 5 | 3 | 1 UL | 1 | 1 | 1 | 1 | 1 UL | 1 | 7 | 5 | |
| | DL | 5 | 3 | 1, 9 | 7 | DL | 7 | 7 | 7 | 7 | DL | | 3 | 1 | 7 |
| | 3 UL | 3 | 1, 9 | 7 | 5 | 3 UL | 3 | 3 | 3 | 3 | 3 UL | | 1 | 7 | 5 |
| | DL | 7 | 5 | 3 | 1, 9 | DL | 9 | 9 | 9 | 9 | DL | 7 | | 3 | 1 |
| | 5 UL | 5 | 3 | 1, 9 | 7 | 5 UL | 5 | 5 | 5 | 5 | 5 UL | 5 | | 1 | 7 |
| | DL | 1, 9 | 7 | 5 | 3 | DL | 1 | 1 | 1 | 1 | DL | 1 | 7 | | 3 |
| | 7 UL | 7 | 5 | 3 | 1, 9 | 7 UL | 7 | 7 | 7 | 7 | 7 UL | 7 | 5 | | 1 |
| | DL | 3 | 1, 9 | 7 | 5 | DL | 3 | 3 | 3 | 3 | 7 DL | 3 | 1 | 7 | |
| | | | | | | 9 UL | 9 | 9 | 9 | 9 | | | | | |
| | | | | | | DL | 5 | 5 | 5 | 5 | | | | | |

In Table 7, of represents one frame number; each digit in the "option" column is a serial number of the option of the basic pattern; and each digit in the column other than "option" represents a subframe number of the subframe. According to Table 7, each basic pattern of Alt1 includes 5 DL subframes and 5 UL subframes; each basic pattern of Alt2 includes 4 DL subframes and 4 UL subframes; and each basic pattern of Alt3 includes 3 DL subframes and 3 UL subframes. In each basic pattern, the interval between UL subframes is equal to the retransmission period of the UL process, and the interval between DL subframes is equal to the interval between the UL subframes. In a period equivalent to an integer (e.g., 4)

2, . . . , 39), and then the (k+4) mod 40 corresponds to the UL subframe in this basic pattern, and it is same with option 1.

In Table 7, the subframe numbers of the subframes in all basic patterns are all even numbers or all odd numbers. Therefore, the basic patterns whose subframe numbers are all even numbers are included into Group A, and the basic patterns whose subframe numbers are all odd numbers are included into Group B, the subset of the basic patterns attributable to Group A in Alt i (i=1, 2, 3) are called "Alt i even"; and the subset of the basic patterns attributable to Group B in Alt i (i=1, 2, 3) are called "Alt i odd". For example, options {0, 2, 4, 6, 8} in Alt2 are called "Alt2 even"; and options {1, 3, 5, 7, 9} in Alt2 are called "Alt2 odd".

Each of the three types of basic patterns Alt1, Alt2, and Alt3 above corresponds to an HARQ timeline. When a subframe of one basic pattern coincides with a subframe of another basic pattern, namely, the two basic patterns have common UL subframe or DL subframe, and the subframe numbers of the common subframe in both of the two basic patterns are same, and the frame numbers of the frame, in which the common subframe is located, in both of the two basic are same, therefore, HARQ timeline conflict occurs between the two basic patterns, and the UL/DL HARQ process in one basic pattern collides with that in the other on the UL/DL subframe. That is, according to the HARQ timeline of one basic pattern, communication is required on an UL or DL subframe; according to the HARQ timeline of the other basic pattern, communication is also required on this UL or DL subframe, and therefore, conflict occurs.

Among the two basic patterns vulnerable to conflict, if the subframes in one basic pattern are used for the access link and the subframes in the other basic pattern are used for the relay link, HARQ timeline conflict may occur between the relay link and the access link. Three solutions to the HARQ timeline conflict are as follows: (i) allocate the basic patterns not vulnerable to conflict to the relay link and the access link to avoid conflict; or (ii) change the HARQ timeline, namely, adjust the HARQ timeline of the process vulnerable to collision, for example, adjust the ACK/NAK feedback interval of the UL/DL process, or adjust the interval between the UL grant and the UL transmission, or adjust the UL retransmission period; or (iii) select either the relay link or the access link for transmission, and discard the transmission on the other link, and therefore, the HARQ process on the non-discarded link incurs loss on the colliding subframe.

If the two conflicting basic patterns are used for two different UEs, the eNB or the RN may differentiate the two colliding HARQ processes by differentiating the UEs. If the two basic patterns are used for two different processes of the same UE, conflict may occur. To overcome the conflict, the eNB or the RN may differentiate the two processes through a process number; or schedule the subframes corresponding to the non-colliding basic patterns and their HARQ timeline to different processes of the same UE.

In Table 7, the conflicting basic patterns are:

Option m, m□{0, 2, 4, 6} in Alt1 and option n, n□{0, 2, 4, 6} in Alt2;

Option m, m□{1, 3, 5, 7} in Alt1 and option n, n□{1, 3, 5, 7} in Alt2;

Option m, m□{0, 2, 4, 6} in Alt3 and option n, n□{0, 2, 6} in Alt2;

Option m, m□{1, 3, 5, 7} in Alt3 and option n, n□{1, 5, 7} in Alt2;

Option m in Alt3 and option n in Alt1, m=n; m, n□{0, 1, 2, 3, 4, 5, 6, 7}

With the evolution of the network, the UEs of multiple versions (R8-UE, R9-UE, or R10-UE) may coexist, and the eNB or RN will serve the R8/9/10-UE on the subframes that are completely backward-compatible, and serve the R10-UE on the subframes that are not completely backward-compatible. In this case, the UL/DL HARQ timeline of the R10-UE may be different from that of the R8/9.

In conclusion, the subframes included in the basic patterns in Table 7 or combinations of the basic patterns are not all available to the relay link. In an embodiment of the present invention, the selection of the subframes for the relay link needs to allow for the following factors:

1) Backward compatibility with the Rel-8/9 UE needs to be ensured;

2) The change of Rel-10 UE, Rel-10 RN, and Rel-10 eNB compared with Rel-8 needs to be minimized;

3) The HARQ process of the relay link does not conflict with the HARQ process of the access link. That is, no UL/DL relay link subframe of the following characteristics exists: according to the HARQ timeline of the relay link, relay transmission is required on this subframe; and, according to the HARQ timeline of the access link, transmission is also required on this subframe;

4) The DL relay link subframes do not include the DL subframe that are not configurable as MBSFN subframes; in the LTE FDD, the DL relay link subframes do not include the DL subframes {0, 4, 5, 9};

5) The relay subframes are distributed as evenly as possible in each frame, which is conducive to delay control and simplicity;

6) The backhaul link has enough resources to ensure matching of the capacity with the access link (including multiple RNs);

7) The backhaul resources are allocated as flexibly as possible to support different numbers of RNs and different application scenarios and channel conditions; and the relay link and the UE_eNB share the resources in the same subframe; and 8) The MBSFN service is supported at the same time.

According to the foregoing factors, the options {0, 2, 6, 1, 5, 7} in Alt2 and the basic patterns in Alt3 do not include subframe that is not configurable as an MBSFN in the LTE/LTE-A FDD system, namely, do not include DL subframe {0, 4, 5, 9}. The subframes included in such basic patterns are all available to the relay link, and the relay link uses the HARQ timeline corresponding to the basic pattern on every subframe of such basic patterns. Meanwhile, in order to avoid conflict between the basic patterns used by the relay link and the access link, the basic patterns allocated to the UE need to be the basic patterns that do not conflict with the basic patterns used by the relay link, or a combination of such basic patterns. Table 8 gives the details:

TABLE 8

| Basic pattern selected for relay link [option m] | Basic pattern available to access link | | |
|---|---|---|---|
| Alt 2' even | Alt1 odd | Alt 2 complementary set | Alt 3 odd |
| Alt 2' odd | Alt1 even | Alt 2 complementary set | Alt 3 even |
| Alt2' even + Alt2' odd | — | Alt 2 complementary set | — |
| Alt 3 even | Alt1 complementary set | Alt 2 odd + {4, 8} | Alt3 complementary set |
| Alt 3 odd | Alt1 complementary set | Alt 2 even + {3, 9} | Alt3 complementary set |
| Alt3 even + Alt3 odd | Alt1 complementary set | Alt2 {3, 4, 8, 9} | Alt3 complementary set |
| Alt2' even + Alt3 odd | Alt1 odd complementary set | Alt 2 even complementary set + {3, 9} | Alt3 odd complementary set |
| Alt2' odd + Alt3 even | Alt1 even complementary set | Alt 2 odd complementary set + {4, 8} | Alt3 even complementary set |

In Table 8, "Alt 2' even" refers to Alt2 option {0, 2, 6}; "Alt 2' odd" refers to Alt2 option {1, 5, 7}; "complementary set" refers to a set of basic patterns mutually complementary to the basic patterns [option m] selected for the relay link, for example, "Alt3 complementary set" refers to a set of basic patterns mutually complementary to the basic patterns [option m] selected for the relay link in Alt3; "Alt2 even complementary set" refers to a set of basic patterns mutually complementary to the basic patterns [option m] selected for the relay link in "Alt2 even".

Because there are many basic patterns of the same type, different basic patterns of the same quantity may form different combinations of the same percentage. It is assumed that of is the total number of all UL/DL subframes in a basic pattern with a period equivalent to an integer (e.g., 4) multiple of one frame; the basic patterns used for the relay link are [option m]□{Alt2 option{0, 2, 6, 1, 5, 7}, Alt3}, m=1, 2, . . . N, 1≤N≤8, and the number of UL/DL subframes included in [option m] of the basic patterns is Km, Km□{3, 4}, and therefore, the number of UL/DL subframes of the relay link is $$\sum_{m=1}^{N} K_m,$$

and $$\max\left\{\sum_{m=1}^{N} K_m\right\} = 24;$$

and the ratio of the number of the UL/DL subframes for the relay link to the number of the UL/DL subframes for the access link is $$\left(\sum_{m=1}^{N} K_m\right) : \left(Nf - \sum_{m=1}^{N} K_m\right).$$

The relation of non-collision between the relay link and the access link in Table 8 may be detailed as follows:

Table 9 shows several modes of configuring subframes for the relay link. That is, Table 9 deals with, in a period equivalent to an integer multiple of one frame, which subframes are configured for transmission of the relay link; and sets out the subframes that are available to the access link and meet the LTE R8 HARQ timeline in various configuration modes, and the subframes that meet the Alt2/Alt3 HARQ timeline. The subframes used for the R8/9-UE need to meet the LTE R8 HARQ timeline, namely, the subframes in the basic patterns of Alt1; the subframes used for the R10-UE may be the subframes in the basic patterns of Alt1 or Alt2 or Alt3. However, considering the complexity afforded by the R10-UE, the subframes that do not conflict with the relay link but belong to the basic patterns of Alt2 or Alt1 are preferably allocated to the R10-UE. If the system allows more than one HARQ timeline to be available to the UE, the system needs to clearly specify the HARQ timeline used for the process of this UE when allocating resources to the UE; conversely, if the system allows the UE to use only one definite HARQ timeline, the system does not need to specify the HARQ timeline. Table 10 shows the HARQ timeline on each link illustrated in Table 9:

TABLE 10

| index | | PDSCH VS. UL ACK/NACK (ms) | PUSCH VS. PHICH (ms) | PUSCH VS. PHICH/ UL Grant VS. PUSCH (ms) | UL retransmission period (ms) |
|---|---|---|---|---|---|
| 0 | relay link | 4 | 6 | 4 | 10 |
|   | R8/9/10-UE | 4 | 4 | 4 | 8 |
|   | R10-UE | 4 | 6 | 4 | 10 |
| 1, 2 | relay link | 4 | 6 | 4 | 10 |
|   |   | 4 | 4, 12 | 4 | 8, 16 |
|   | R8/9/10-UE | 4 | 4 | 4 | 8 |
|   | R10-UE | 4 | 6 | 4 | 10 |
| 3 | relay link | 4 | 4, 12 | 4 | 8, 16 |
|   | R8/9/10-UE | 4 | 4 | 4 | 8 |
|   | R10-UE | 4 | 6 | 4 | 10 |

Table 10 reveals that the HARQ timelines corresponding to Alt2 and Alt3 are two HARQ timelines available to the relay link. Depending on the configuration mode, the relay link may use only one of the timelines, or use both timelines at the same time.

TABLE 9

| index | for relay link | | for access link | |
|---|---|---|---|---|
| 0 | Alt 2 [option m], m = 0, 2, 6 | Alt 1 [option k], k = 1, 3, 5, 7 | Alt 2 [option k], k≠m, k = 0, 1, 2, . . . , 9 | Alt 3 [option k], k = 1, 3, 5, 7 |
|   | Alt 2 [option m], m = 1, 5, 7 | Alt 1 [option k], k = 0, 2, 4, 6 | Alt 2 [option k], k≠m, k = 0, 1, 2, . . . , 9 | Alt 3 [option k], k = 0, 2, 4, 6 |
|   | Alt 2 [option m], & Alt 2 [option n]; m = 0, 2, 6; n = 1, 5, 7 | — | Alt 2 [option k], k≠m, &k≠n; k = 0, 1, 2, . . . , 9 | — |
| 1 | Alt 2 [option m], & Alt 3 [option n]; m = 0, 2, 6; n = 1, 3, 5, 7 | Alt 1 [option k], k≠n; k = 1, 3, 5, 7 | Alt 2 [option k], k≠m, k = 0, 2, 4, 6, 8, 3, 9 | Alt 3 [option k], k≠n; k = 1, 3, 5, 7 |
| 2 | Alt 2 [option m], & Alt 3 [option n]; m = 1, 5, 7; n = 0, 2, 4, 6 | Alt 1 [option k], k≠n; k = 0, 2, 4, 6 | Alt 2 [option k], k≠m, k = 1, 3, 5, 7, 9, 4, 8 | Alt 3 [option k], k≠n; k = 0, 2, 4, 6 |
| 3 | Alt 3 [option m], m = 0, 2, 4, 6 | Alt 1 [option k], k≠m, k = 0, 1, 2, . . . , 7 | Alt 2 [option k], k = 1, 3, 5, 7, 9, 4, 8 | Alt 3 [option k], k≠m, k = 0, 1, 2, . . . , 7 |
|   | Alt 3 [option m], m = 1, 3, 5, 7 | Alt 1 [option k], k≠m, k = 0, 1, 2, . . . , 7 | Alt 2 [option k], k = 0, 2, 4, 6, 8, 3, 9 | Alt 3 [option k], k≠m, k = 0, 1, 2, . . . , 7 |
|   | Alt 3 [option m], & Alt 3 [option n]; m = 0, 2, 4, 6; n = 1, 3, 5, 7 | Alt 1 [option k], k≠m, &k≠n; k = 0, 1, 2, . . . , 7 | Alt 2 [option k], k = 3, 4, 8, 9 | Alt 3 [option k], k≠m, &k≠n; k = 0, 1, 2, . . . , 7 |

Depending on the mode of configuring subframes for the relay link in Table 9, the maximum number of HARQ processes on the relay link and the access link differs, as detailed in Table 11:

TABLE 11

| Subframes configured for the relay link in a period equivalent to an integer multiple of one frame | Relay link | Maximum number of HARQ processes | |
|---|---|---|---|
| | | UE with Alt1 HARQ timeline | UE with Alt2 HARQ timeline |
| m basic patterns of Alt 2/DL subframe group, or m DL/UL subframes in a frame | m | 4 or 0 | 10-m |
| m basic patterns of Alt 2/DL subframe group, or m DL/UL subframes in a frame, and n basic patterns of Alt 3/DL subframe group | m + n | 4-n or 0 | 4 or 7-m |
| m basic patterns of Alt 3/ DL subframe group | m | 8-m | 4 or 7 |

As shown in Table 11, depending on the mode of configuring subframes for the relay link, the positions of and the number of the subframes available to the UE differ, and the ratio of the number of subframes available to the R8/9-UE to the number of subframes available to the R10-UE also differs. That is, if the mode of configuring subframes for the relay link, the maximum number of HARQ processes of the relay link differs, the ratio of the supported number of subframes for R8/9-UE to the supported number of subframes for R10-UE differs, and the supported maximum number of HARQ processes for R8/9-UE and R10-UE differs. The system may select the proper configuration mode as required.

According to the actual conditions, for example, the application site such as urban area or suburban area; load, service type, and Quality of Service (QoS); resources owned by the base station, such as size of resources, continuous/discontinuous spectrum, and carrier aggregation; the positions of the number of the RNs distributed in the eNB; the ratio of the number of R8/9-UE's to the number of R10-UE's; and the actual wireless propagation environment features, the base station and the RN can determine the required relay link resource, select the proper configuration of subframes for the relay link, including the number of and the positions of subframes, and HARQ timeline, and allocate the resources for the relay link flexibly. In this way, the capacity of the relay link matches the capacity of the access link, and the base station can serve the most possible users and improve the capacity of the network while providing relay transmission. In the network, each base station has different actual conditions. Therefore, the subframes configured by one cell for the relay link may differ from the subframes configured by another cell.

There are many modes of configuring subframes for the relay link. In practice, the actually applied modes of configuring subframes for the relay link in the system may be all the modes set out in Table 9, or a subset selected in Table 9. Meanwhile, the system can categorize the modes of configuring subframes for the relay link. In the categorization in Table 9, index#0 corresponds to a scenario that all basic patterns belong to Alt2; index#1 corresponds to a scenario that the even-numbered basic patterns belong to Alt2 and the odd-numbered basic patterns belong to Alt3; index#2 corresponds to a scenario that the odd-numbered basic patterns belong to Alt2 and the even-numbered basic patterns belong to Alt3; and index#3 corresponds to a scenario that all basic patterns belong to Alt3. In fact, the modes of configuring subframes for the relay link can be categorized in many ways. The index categorization method shown in Table 9 is only an example.

Before relay transmission is performed, the system needs to notify relevant configuration information about the relay link to the RN and/or neighboring cell. The configuration information includes:

1. Validity period of configuration of the relay link, and/or validity flag bit. That is, according to the system load, relay channel conditions, relay application scenario, and UE QoS, the eNB needs to notify the time effectiveness of the configuration information while notifying the configuration information about the relay link. For example, the configuration information is valid in a period equivalent to an integer multiple of one frame, such as in 1 frame, 4 frames, 32 frames, 64 frames, 128 frames, or 256 frames. A validity flag bit may be set at the same time to indicate whether the current configuration information is valid. For example, "1" indicates that the configuration information is valid, and "0" indicates that the configuration information is invalid. If the current configuration information is found invalid, new configuration information needs to be received. Another mode is that the validity is indicated periodically. The period depends on the change of the subframes required for the relay link and the foregoing factors. Generally, for a fixed RN, the validity may be indicated at longer intervals; for a mobile relay, the validity may be indicated at shorter intervals.

2. Configuration of subframes for the relay link, namely, which subframes are used for transmission of the relay link.

The configuration information about the subframes for the relay link may be indicated in one of the following ways:

(i) A bitmap that takes an integer multiple of one frame as a period directly indicates the subframes for the relay link. That is, the bitmap indicates which subframes in a period equivalent to the integer multiple of one frame are used for the relay link. The configuration in every period is the same. Each bit corresponds to a DL subframe or UL subframe used for the relay link. If this subframe is used for the relay link, the bit corresponding to this subframe is set to 1, or else 0. The number of bits of a bitmap is equal to the number of all DL subframes or all UL subframes to be possibly used for the relay link in a period equivalent to an integer multiple of one frame.

(ii) Bitmap mode of basic patterns. That is, a bitmap is used to indicate which basic patterns are used for the relay link. Each bit corresponds to a basic pattern to be possibly used for the relay link. If this basic pattern is used for the relay link, the bit corresponding to this basic pattern is set to 1, or else 0. The number of bits of a bitmap is equal to the number of basic patterns to be possibly used for the relay link. The subframes in the basic patterns or in a combination of basic patterns are configured as subframes for the relay link.

(iii) Bitmap mode of the downlink subframe group. A bitmap indicates which downlink subframe groups in a period equivalent to an integer multiple of one frame are used for the relay link. Each bit corresponds to a downlink subframe group to be possibly used for the relay link. The downlink subframe group is composed of a group of downlink subframes arranged at specific intervals. The interval of the subframes is a retransmission interval of the UL HARQ of the relay link, or an integer multiple of the transmission interval of the UL HARQ. Afterward, the UL subframe for the relay link is obtained according to the following relation. The subframe number of an UL subframe=(subframe number of a DL subframe for the relay link+offset k) mod M, where M is the number of all DL/UL subframes in a period equivalent to an integer multiple of one frame. The offset is determined in the same way as the offset in the first indication method above. The number of bits of a bitmap is equal to the number of DL subframe groups to be possibly used for the relay link.

(iv) Bitmap mode of initial subframes: Supposing that M is the number of all DL/UL subframes in a period equivalent to an integer multiple of one frame, the subframe number of a DL subframe used for the relay link is i=(a+k*L) mod M, and i mod N does not belong to the set P. The set P is a set of subframes not configurable as MBSFN subframes in the system. For example, in an LTE system, P={0, 4, 5, 9}, the subframe number of the UL subframe for the relay link is j=(i+b)mod M; L is an UL HARQ retransmission period, M is divisible by L, for example, L={8 or 10}; a is an initial subframe number in an UL HARQ retransmission period, for example, a={0, 1, 2, ..., L−1}; b is an offset between the UL subframe number and the DL subframe number, for example, b=4. The system uses the bitmap indication mode, one bit corresponds to a value "a". The bit "1" means that "a" can have the corresponding value; and bit "0" means that "a" cannot have the corresponding value. Several values of a are obtained according to the bitmap, and then a group of DL subframes and UL subframes are obtained through the foregoing formula according to each value of the obtained "a", and such subframes are used for relay link transmission.

(v) The configuration mode of the relay link subframes is indicated directly. That is, all configuration modes of the relay link subframes actually used by the system are numbered, and then the applied configuration mode is indicated directly. The number of bits required by the indication mode is)⌈ $\log_2(P)$⌉, where P is the number of all possible configuration modes of relay link subframes.

(vi) Combination of any one or more of the five indication modes above.

The configuration information about the relay link may be configured through system messages or notified through higher layer, or notified at the time of initialization of the RN, or notified while the RN accesses the base station. Afterward, the RN can select proper subframes and HARQ timelines for the served UE according to the rules shown in Table 9.

In order to support the Multimedia Broadcast and Multicast Service (MBMS), the base station can preferably configure the MBSFN subframes used by other than the relay link for this service. If the configuration of the relay link subframes differs between the base station or RN, negotiation between the base stations or RNs needs to be performed at the network side, the MBSFN subframes that are shared by all base stations or RNs and other than the relay link subframes are configured for the MBMS service in the same multicast service area. If no subframe that is shared by all base stations or RNs and available to the MBMS service exists in the same multicast service area, the range of this multicast service area may be adjusted properly, and/or the relay link subframe configuration of certain base station or RN may be adjusted so that such shared subframes available to the MBMS service exist in this area.

Besides, if some of the MBSFN subframes are used for the relay link and some are used for the MBMS service, it is necessary to notify the UE which communication is performed on such subframes.

Figure 5:
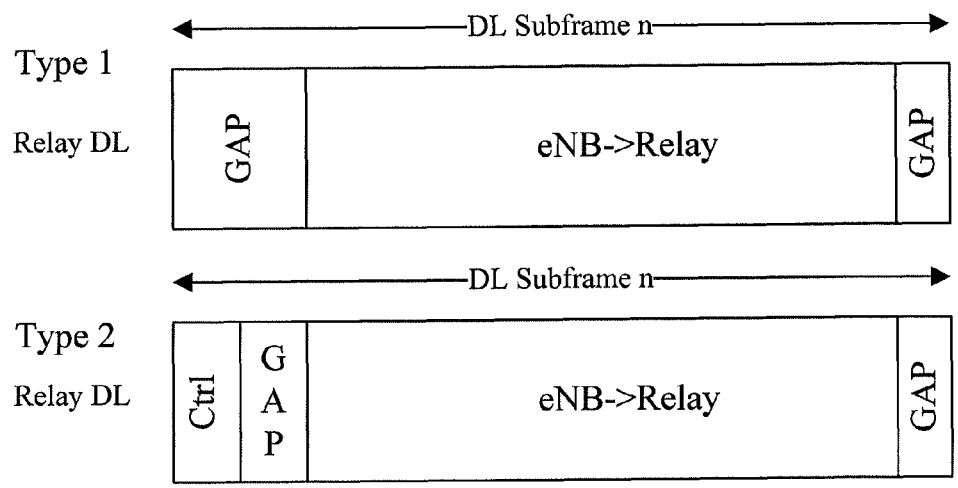
FIG. 5 is a schematic diagram showing guard periods in a relay link subframe according to an embodiment of the present invention.

For the selected relay link subframes, a guard period (GAP) may be reserved according to the synchronization error/transmission delay and the receiving and transmitting state transition time of the RN. The guard period is located in the relay subframe. In the guard period, the RN does not receive or transmit data, and may transition between the idle state and/or the receiving and transmitting state. The length of the guard period may be K multiples of the LTE sampling interval, where K is an integer. For example, K is a divisor of the number of Fourier transformation points, as detailed in FIG. 5. In FIG. 5, Ctrl refers to sending PFICH, PHICH, UL grant, or reference signal on the RN->UE_RN link.

As shown in FIG. 5, on the selected DL subframe n, if the DL subframe n−1 is used for the access link RN→UE_RN, it is necessary to reserve the guard period at the head of the DL subframe n; if the DL subframe n+1 is used for the access link RN→UE_RN, it is necessary to reserve the guard period at the end of the DL subframe n. Depending on whether communication on the access link RN→UE_RN exists on the DL subframe n, the DL subframe n is categorized into two types:

Type1: Communication on the access link RN→UE_RN does not exist on the DL subframe n. In this case, it is only necessary to reserve a guard period at the head and the end of the subframe.

Type2: Communication on the access link RN→UE_RN exists on the selected DL relay link subframe (DL subframe n), for example, PCFICH, PHICH, UL grant, or reference signal information. In this case, it is necessary only to reserve the guard period in the mode shown in FIG. 5. Ctrl in FIG. 5 includes one or all of such control information.

When the DL relay link subframe is located at the MBSFN subframe, the reserved guard period may do not use the unicast OFDM symbol of the MBSFN subframe, or the reserved guard period may use a part of or all of the unicast OFDM symbol of the MBSFN subframe. The following description is specific to Type 1 and Type 2, as detailed in FIG. 6.

Figure 6:
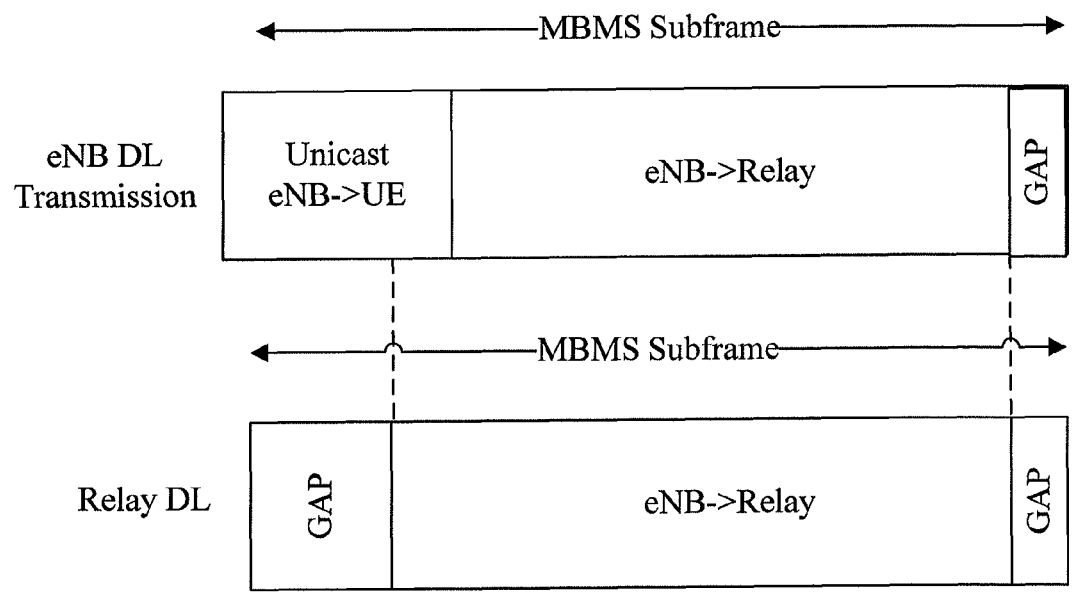
FIG. 6 is a schematic diagram showing how to unicast OFDM symbols by using MBSFN subframes in a part of the guard period according to an embodiment of the present invention.

FIG. 6 shows Type 1. Some of the guard period in FIG. 6 uses the unicast OFDM symbols of the MBSFN subframes, the guard period at the head of the relay link subframe uses the first 1 to 2 OFDM symbols of the MBSFN subframes, but extra guard period needs to be reserved at the end of the subframe for the purpose of the transmitting and receiving state transition of the relay and/or transmission delay.

Figure 7:
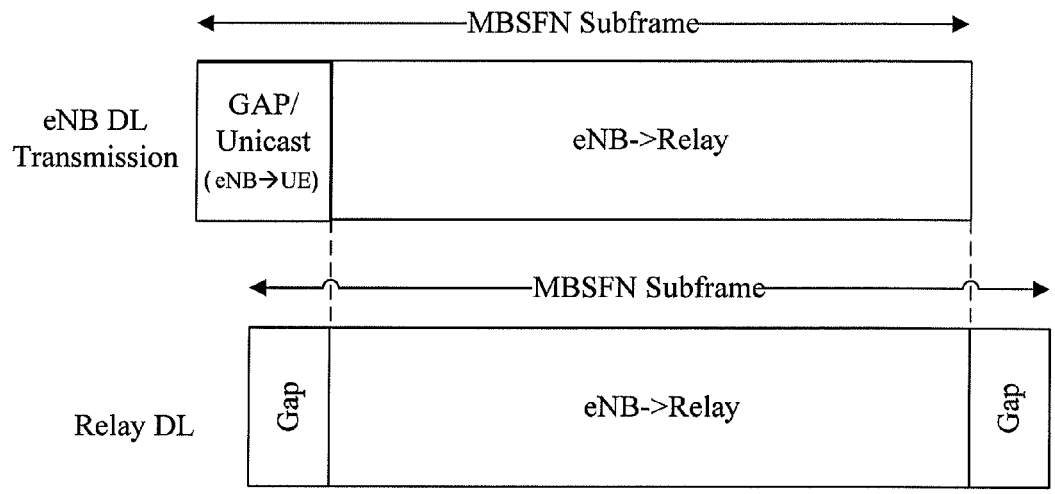
FIG. 7 is a schematic diagram showing how to determine a guard period when an offset exists between the eNB and the Relay subframe in Type1 according to an embodiment of the present invention.

FIG. 7 shows Type1. That is, when the RN has no unicast service in the relay subframe, if an offset exists between the eNB and the RN subframe, the total length of the guard period at the header and the end of the relay subframe is the length of 1 or 2 OFDM symbols used by the eNB for unicast services. For example, in FIG. 7, the guard period at the head of the relay subframe occupies a half of the unicast OFDM symbol of the MBSFN subframe, and the guard period at the end of the relay subframe occupies the other half.

Figure 8:
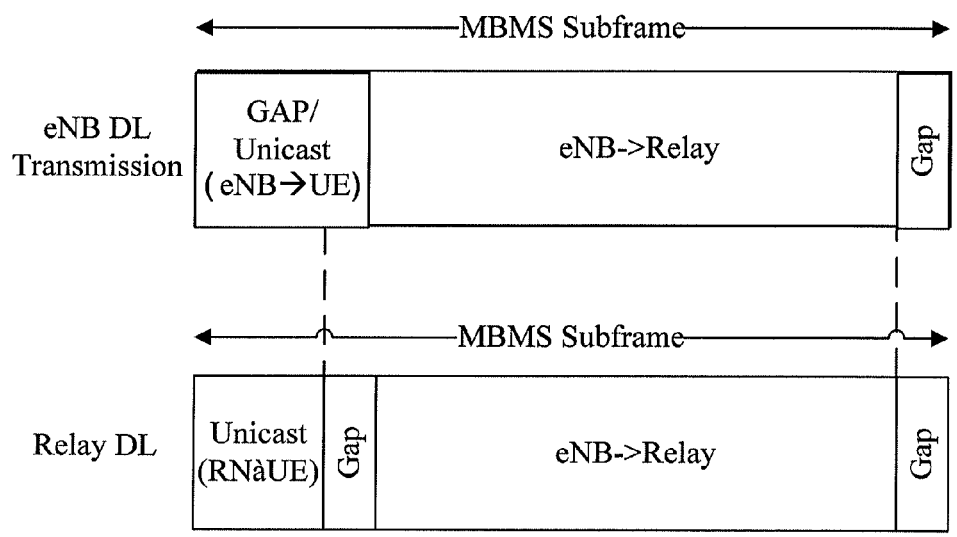
FIG. 8 is a schematic diagram showing how to unicast OFDM symbols without using MBSFN subframes in the guard period according to an embodiment of the present invention.

FIG. 8 shows Type2. The first 1 to 2 OFDM symbols of the relay link subframe are still used for the unicast service on the access link RN→UE_RN, and the subsequent guard period and the guard period at the end of the subframe need to be reserved additionally for the transmitting and receiving state transition of the relay and/or transmission delay.

Figure 9:
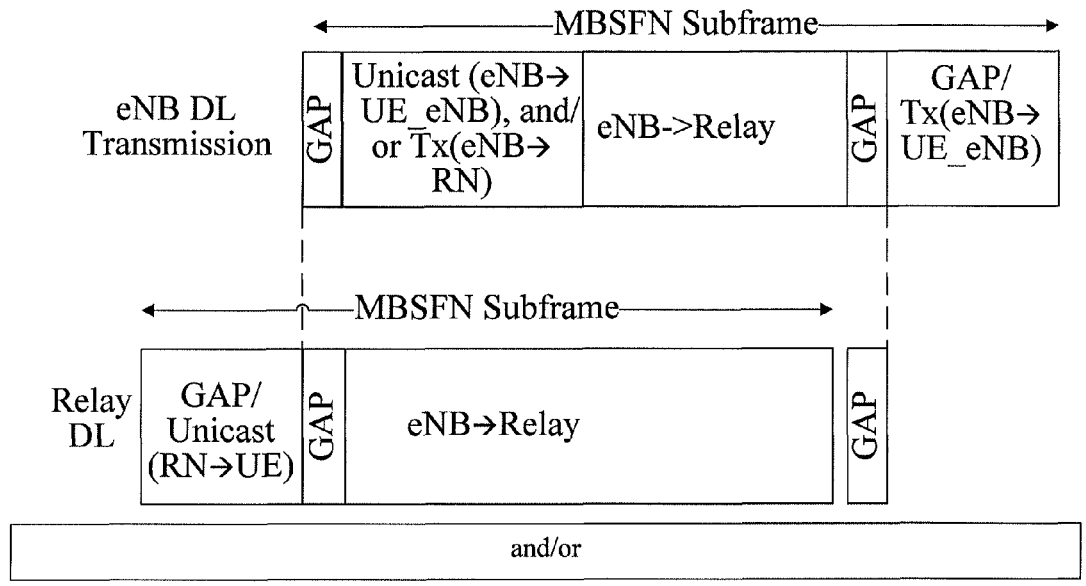
FIG. 9 is a schematic diagram showing how to unicast OFDM symbols without using MBSFN subframes in the guard period according to an embodiment of the present invention.

FIG. 9 shows Type2, in which the guard period does not use the unicast OFDM symbol of the MBSFN subframe. That is, when an offset shown in FIG. 9 exists between the eNB and the RN subframe, the first unicast OFDM symbols of the relay link subframe (namely, the first 1 to 2 OFDM symbols of the MBSFN subframe) are still used by the RN for the unicast service on the RN→UE_RN link. The subsequent guard period and the guard period at the end of the subframe need to be reserved additionally for the transmitting and receiving state transition of the relay and/or transmission delay.

Figure 10A:
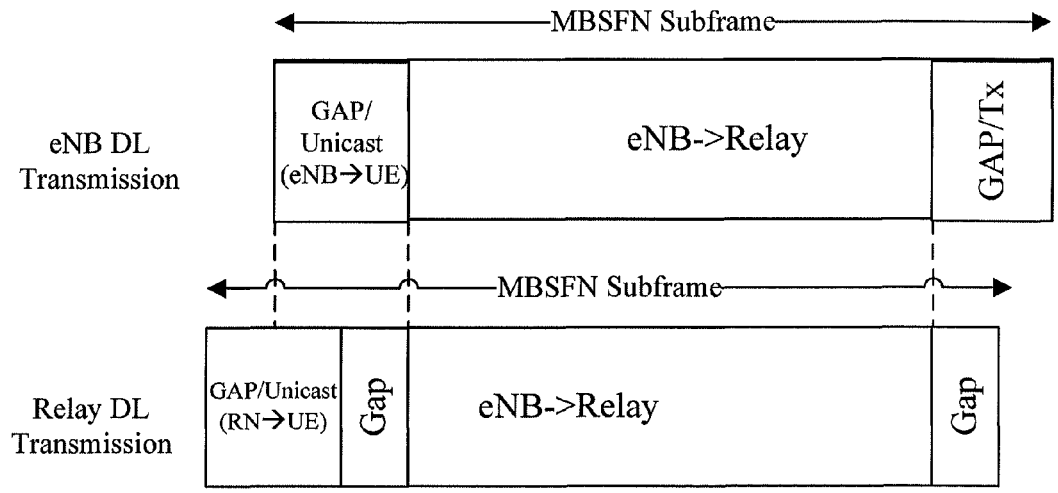
FIG. 10a is a schematic diagram showing how to determine a guard period when an offset exists between the eNB and the RN subframe in Type2 according to an embodiment of the present invention.

FIG. 10a shows Type2, namely, a method of determining the guard period when a unicast service exists in the RN relay subframe, and an offset exists between the eNB and the RN subframe. In FIG. 10a, the length of the guard period in the relay subframe is an integer multiple of the LTE sampling interval, for example, 1 OFDM symbol.

The corresponding guard period of the UL relay subframe needs to be K multiples of the sampling interval, where K is an integer. For example, K is a divisor of the number of Fourier transformation points.

In the case that the selected DL relay link subframe is not on the MBSFN subframe, the guard period is located on the relay subframe, like the description above.

In an embodiment of the present invention, based on FIG. 3, according to the characteristics of the first and the second processing methods, the first processing method is applied to handle the DL subframe0 of each option in Group x, and DL subframes {5, 9} of each option in Group y, to obtain Table 12. The second processing method is applied to handle DL subframe 0 of each option in Group x to obtain Table 13. The first processing method is applied to handle DL subframes {0, 4} of each option in Group x, and DL subframes {5, 9} of each option in Group y, to obtain Table 14.

TABLE 12

| | Frame | | nf | nf + 1 | nf + 2 | nf + 3 |
|---|---|---|---|---|---|---|
| Group x | option 0 | UL | 0, 8 | 6 | {4} | 2 |
| | | DL | 4 | 2 | /(0), 8 | 6 |
| | option 2 | UL | 2 | 0, 8 | 6 | {4} |
| | | DL | 6 | 4 | 2 | /(0), 8 |
| | option 4 | UL | {4} | 2 | 0, 8 | 6 |
| | | DL | /(0), 8 | 6 | 4 | 2 |
| | option 6 | UL | 6 | {4} | 2 | 0, 8 |
| | | DL | 2 | /(0), 8 | 6 | 4 |
| Group y | option 1 | UL | 1, {9} | 7 | 5 | {3} |
| | | DL | /(5) | 3 | 1, /(9) | 7 |
| | option 3 | UL | {3} | 1, {9} | 7 | 5 |
| | | DL | 7 | /(5) | 3 | 1, /(9) |
| | option 5 | UL | 5 | {3} | 1, {9} | 7 |
| | | DL | 1, /(9) | 7 | /(5) | 3 |
| | option 7 | UL | 7 | 5 | {3} | 1, {9} |
| | | DL | 3 | 1, /(9) | 7 | /(5) |
| Others | | | Above combination(option i + option j) | | | |

Note

{—} indicates being applied to, or not being applied to, processing of the relay link; / indicates that the subframe does not serve as a relay link subframe; (—) indicates need of special processing, as detailed below:
Note 1:
UL {x} indicates that subframe x is processed in the same way as UL subframe n + 4 in Table 1.
Note 2:
DL/(y) indicates that subframe y does not serve as a relay subframe, but is used for the access link RN->UE_RN, and is processed in the same way as DL subframe n in Table 3; and the processing of DL/(y) corresponds to the processing of UL {x}.
Note 3:
All other subframes not marked here are used for the relay link, and the HARQ-related timeline processing is shown in Table 2.

TABLE 13

| | Frame | | nf | nf + 1 | nf + 2 | nf + 3 |
|---|---|---|---|---|---|---|
| Group x | option0 | UL | 0, 8 | 6 | (4) | 2 |
| | | DL | 4 | 2 | [0], 8 | 6 |
| | option2 | UL | 2 | 0, 8 | 6 | (4) |
| | | DL | 6 | 4 | 2 | [0], 8 |
| | option4 | UL | (4) | 2 | 0, 8 | 6 |
| | | DL | [0], 8 | 6 | 4 | 2 |
| | option6 | UL | 6 | (4) | 2 | 0, 8 |
| | | DL | 2 | [0], 8 | 6 | 4 |
| Others | | | Above combination (option i + option j) | | | |

Note

[—] indicates being applied to special subframes for the relay link and the access link simultaneously; and (·) indicates need of special processing, as detailed below:
Note 1:
UL (x) indicates that subframe x is applied to the relay link RN->eNB, the PUSCH is sent, and the UL ACK/NACK from the eNB->RN PDSCH is not sent (if the relay does not need to meet the LTE HARQ timeline, the UL ACK/NACK may be sent).
Note 2:
DL [y] means that: In subframe y, on the relay link eNB->RN, the eNB sends the PHICH and the UL grant, and does not send anything left; on the access link RN->UE_RN, the RN sends BCH and SCH only, and does not send any other control signals or data of RN->UE_RN.

TABLE 14

| | Frame | | nf | nf + 1 | nf + 2 | nf + 3 |
|---|---|---|---|---|---|---|
| Group x | option0 | UL | 0, {8} | 6 | {4} | 2 |
| | | DL | /(4) | 2 | /(0), 8 | 6 |
| | option2 | UL | 2 | 0, {8} | 6 | {4} |
| | | DL | 6 | /(4) | 2 | /(0), 8 |
| | option4 | UL | {4} | 2 | 0, {8} | 6 |
| | | DL | /(0), 8 | 6 | /(4) | 2 |
| | option6 | UL | 6 | {4} | 2 | 0, {8} |
| | | DL | 2 | /(0), 8 | 6 | /(4) |
| Group y | option1 | UL | 1, {9} | 7 | 5 | {3} |
| | | DL | /(5) | 3 | 1, /(9) | 7 |
| | option3 | UL | {3} | 1, {9} | 7 | 5 |
| | | DL | 7 | /(5) | 3 | 1, /(9) |
| | option5 | UL | 5 | {3} | 1, {9} | 7 |
| | | DL | 1, /(9) | 7 | /(5) | 3 |
| | option7 | UL | 7 | 5 | {3} | 1, {9} |
| | | DL | 3 | 1, /(9) | 7 | /(5) |
| choose | | | Above combination (option i + option j) | | | |

Note

{—} indicates being applied to, or not being applied to, processing of the relay link; / indicates that the subframe does not serve as a relay link subframe; (·) indicates need of special processing, as detailed below:
Note 1:
UL {x} indicates that subframe x is processed in the same way as UL subframe n + 4 in Table 1.
Note 2:
DL/(y) indicates that subframe y does not serve as a relay subframe, but is used for the access link RN->UE_RN, and the processing of DL/(y) corresponds to the processing of UL {x}.
Note 3:
All other subframes not marked here are used for the relay link, and the HARQ-related timeline processing is shown in Table 2.

Table 5 reveals that the selection method available to the relay link subframe in the LTE FDD system is as follows:

TABLE 15

| Ns | Selection of relay link subframes |
|---|---|
| 1 | Any option in Table 12, or a combination of such options; or, any option in Group x in Table 13, or a combination of such options |
| 2 or 4 | Any option in Table 14, or a combination of such options |

According to the subframe selection method above, Table 16 gives several methods of selecting relay link subframes.

TABLE 16

| Ns | Exemplary selection of relay link subframes in an LTE FDD system |
|---|---|
| 1 | Option 0 in Table 12, option 0 + option 1 in Table 12, or option 0 in Table 13 |
| 2 or 4 | Option 0 + option 1 in Table 14 |

Selections and the relevant special processing methods are elaborated below. The first processing method is applied to the DL relay link subframes {0, 5, 9} in Table 12. Therefore, option 0 in Table 12 is abbreviated as option0-M1, option 1 is abbreviated as option1-M1; and, likewise, option 0 in Table 13 is abbreviated as option0-M2.

1. Option0-M1

As mentioned above, the option0-M1 solution is applicable when Ns is equal to 1. Moreover, option 0 does not include DL subframe 9, and it is only necessary to process DL subframe 0. The first processing method comes in two cases, which are analyzed below:

TABLE 17

| | Frame | nf | | nf + 1 | nf + 2 | nf + 3 | |
|---|---|---|---|---|---|---|---|
| option0-M1 Case 1 | UL | 0 | 8 | 6 | 4 | | 2 |
| | Relay link RN->eNB | ○ | ○ | ○ | X | | ○ |
| | Access link UE_RN->RN | X | X | X | ○ | | X |
| | DL | 4 | | 2 | /(0) | 8 | 6 |
| | Relay link eNB->RN | ○ | | ○ | X | ○ | ○ |
| | Access link RN->UE_RN | X | | X | P/S-SCH, P-BCH, reference signal, PCFICH, PDSCH (including data), PDCCH | X | X |

Note
X means that the link is disabled; and
○ means that the link is enabled.

As shown in Table 17, in a period equivalent to frames [nf, nf+3], the subframes for the relay link include UL subframes {0, 8, 6, 2} and DL subframes {4, 2, 8, 6}. After such subframes are removed, all remaining subframes in this period are available to the access links (RN↔UE_RN) & (eNB↔UE_eNB), and the access links meet the HARQ constraints of the LTE FDD. If Ns=1, for any UE, DL subframe 9 is used for receiving paging message, and DL subframes {0, 5} are used for receiving synchronization and broadcast information. The UE_RN is unable to send UL data only on UL subframe 4@frame nf+2.

Meanwhile, the HARQ of the relay link is based on the principles in Table 2, the detailed timeline is shown in Table 18.

TABLE 18

| Subframe 4UL:4DL | DL 4 | UL 8 | DL 2 | UL 6 | DL 0 | UL 4 | DL 8 | UL 2 | DL 6 | UL 0 |
|---|---|---|---|---|---|---|---|---|---|---|
| state for relay link | ○ | ○ | ○ | ○ | X | X | ○ | ○ | ○ | ○ |
| PDSCH VS. UL ACK/NACK | 4 | | 4 | | — | — | 4 | | 4 | |
| PUSCH VS. UL grant | G3 | Process 3 | G4 | Process 4 | — | — | G1 | Process 1 | G2 | Process 2 |
| PUSCH VS. PHICH | P2 | Process 3 | P3 | Process 4 | — | — | P4 | Process 1 | P1 | Process 2 |
| UL retransmission interval | | 8 | | 16 | — | | | 8 | | 8 |

Likewise, DL subframe 0 in option 0 is processed according to case 2 of the first processing method, as detailed in Table 19:

TABLE 19

| | Frame | nf | | nf + 1 | nf + 2 | nf + 3 | |
|---|---|---|---|---|---|---|---|
| option0-M1 Case 2 | UL | 0 | 8 | 6 | 4 | | 2 |
| | Relay link RN->eNB | ○ | ○ | ○ | ○ | | ○ |
| | Access link UE_RN->RN | X | X | X | X | | X |
| | DL | 4 | | 2 | /(0) | 8 | 6 |
| | Relay link eNB->RN | ○ | | ○ | X | ○ | ○ |
| | Access link RN->UE_RN | X | | X | P/S-SCH, PBCH, reference signal; PCFICH, PDSCH (not including data), PDCCH (not including PHICH or UL grant) | X | X |

Table 19 reveals that the Option0-M1 in case 2 also ensures the UE_RN to meet the timeline relation of the LTE FDD HARQ. Moreover, the HARQ on the relay link also meets the principles of Table 2. Case 2 also involves the occasion of sending UL grant and PHICH for multiple UL subframes on a DL subframe, as detailed in Table 2.

Other options in Table 12 are based on the same principles as option0-M1.

2. Option0-M1+Option1-M1

Likewise, the option0-M1+option1-M1 scheme is applicable to Ns=1, and the option in this scheme is composed of two independent options, as shown in Table 20.

relation in the existing option. That also reflects mutual independence between the options, which makes it very easy to combine the options. In an actual system, the number of option combinations may be determined according to the actual traffic on the relay link. That is, if the traffic is low at the beginning, one option is selected; after a period, the traffic increases, and one more option is added to form an option combination.

The number of option combined may be greater than or equal to 2, namely, more than 2 options may be combined together. Other options in Table 12 and Table 13 are combined in the same way as above.

TABLE 20

| | Frame | nf | | | nf + 1 | | | nf + 2 | | | nf + 3 | |
|---|---|---|---|---|---|---|---|---|---|---|---|---|
| (option0-M1) + (option1-M1) | UL | 0 | 1 | 8 | 9 | 6 | 7 | 4 | | | 5 | 2 | 3 |
| | Relay link RN->eNB | ○ | ○ | ○ | ○ | ○ | ○ | X | | | ○ | ○ | ○ |
| | Access link UE_RN->RN | X | X | X | X | X | X | ○ | | | X | X | X |
| | DL | | 4 | | /(5) | 2 | 3 | /(0) | 1 | 8 | /(9) | 6 | 7 |
| | Relay link eNB->RN | | ○ | | X | ○ | ○ | X | ○ | ○ | X | ○ | ○ |
| | Access link RN-> UE_RN | | X | | P/S-SCH, reference signal; PCFICH, PDSCH (not including data, including D-BCH and paging), PDCCH | X | X | P/S-SCH, PBCH, reference signal, PCFICH, PDSCH (including data), PDCCH | X | X | PCFICH, reference signal; PDSCH (not including data, including paging), PDCCH | X | X |

Note
X means that the link is disabled; and
○ means that the link is enabled.

Table 20 reveals that the combination of options is generated in this way: The relay link subframes selected according to the two independent options are arranged in order of time; and each relay link subframe is still processed in the same way as the existing option; and the HARQ relation is also the 3. Option0-M2

Likewise, the option0-M2 scheme is applicable to Ns=1. The second processing method is applied to DL subframe 0 of option 0, as detailed in Table 21.

TABLE 21

| | Frame | nf | nf + 1 | nf + 2 | nf + 3 |
|---|---|---|---|---|---|
| (Option0-M2) | UL | 0, 8 | 6 | (4) | 2 |
| | Relay link RN->eNB | ○ | ○ | ○ (send PUSCH, not send UL ACK/NACK) | ○ |
| | Access link UE_RN->RN | X | X | X | X |
| | DL | 4 | 2 | [0] 8 | 6 |
| | Relay link eNB->RN | ○ | ○ | ○ (Send PCFICH, PHICH, UL grant, and reference signal only) ○ | ○ |
| | Access link RN->UE_RN | X | X | Perform no operation other than the necessary operations, namely, send P/S-SCH, PBCH, and reference signal only | X X |

Note
X means that the link is disabled; and
○ means that the link is enabled.

The option0-M2 not only prevents the access link RN->UE_RN from being affected, but also ensures the HARQ timeline of the relay link to completely meet the LTE FDD timeline relation.

Other options in Table 13 are based on the similar principles as option0-M2, and the options are combined also by putting the options together without any change.

4. option0+option1, The options in Table 14 and their combinations are all under the circumstance of Ns=2 or 4. Here, DL subframes {0, 4, 5, 9} in the options are processed according to case 2 of the first processing method to obtain Table 22.

ization. After obtaining the configuration information, the RN may allocate the subframes corresponding to A1a option k (k=1, 3, 5, 7) to the R8/9/10-UE according to the relation shown in Table 9. On such subframes, the UEs use the HARQ timeline corresponding to Alt1, and the HARQ timeline ensures backward compatibility. The RN may also allocate the subframes corresponding to Alt 2 option k (k=1, 3, 4, 5, 6, 7, 8, 9) to R10-UE. On such subframes, the UEs use the HARQ timeline corresponding to Alt2.

In frame [n, n+3], the maximum number of DL/UL processes of the UE that uses the HARQ timeline corresponding

TABLE 22

| | Frame | nf | nf + 1 | nf + 2 | nf + 3 |
|---|---|---|---|---|---|
| option0 + option1 | UL | 0  1  8   9 | 6  7 | 4       5 | 2  3 |
| | Relay link RN->eNB | ○  ○  ○   ○ | ○  ○ | ○       ○ | ○  ○ |
| | Access link UE_RN->RN | X  X  X   X | X  X | X       X | X  X |
| | DL | /(4)   /(5) | 2  3 | /(0)   1  8 | /(9)  6  7 |
| | Relay link eNB->RN | X   X | ○  ○ | X   ○  ○ | X   ○  ○ |
| | Access link RN->UE_RN UE_RN | PCFICH, reference signal; PDSCH (not including data, including paging), PDCCH (not including PHICH or UL grant) | P/S-SCH, reference signal; PCFICH, PDSCH (not including data, including D-BCH and paging), PDCCH (not including PHICH or UL grant) | X  X | P/S-SCH, PBCH, reference signal, PCFICH, PDSCH (not including data), PDCCH (not including PHICH or UL grant) | X  X | PCFICH, reference signal; PDSCH (not including data, including paging), PDCCH (not including PHICH or UL grant) | X  X |

Note
X means that the link is disabled; and
○ means that the link is enabled.

In this scheme, the method of processing each subframe is as shown in Table 22, and the options are combined also by putting two options together without any change. The processing of other options in Table 14 is also similar.

Figures 10B, 10C, 10D, 10E:
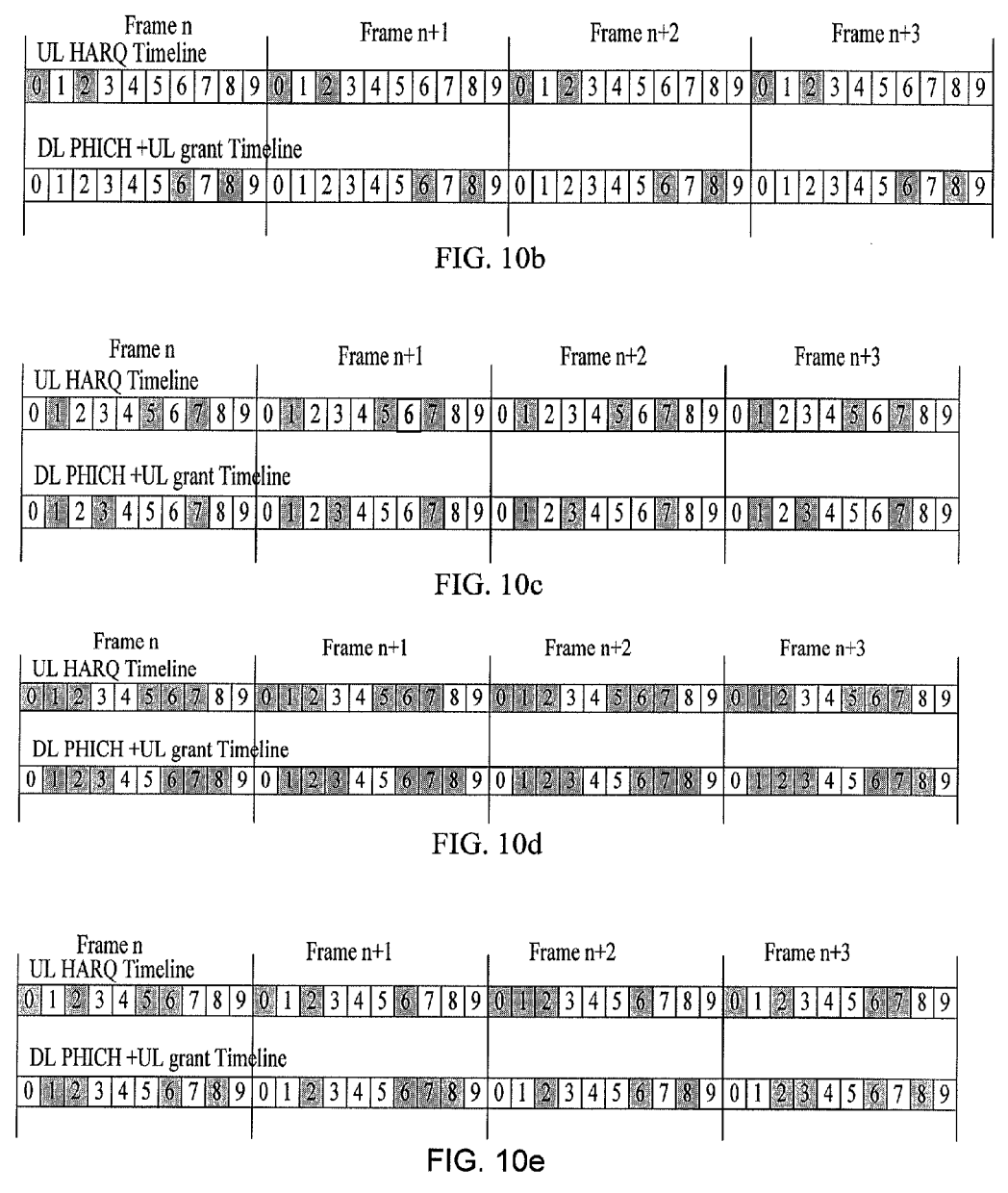

As shown in FIG. 10b, another embodiment of the present invention is an example of the configuration case "Alt 2 [option m], m=0, 2, 6" in Table 9. In this case, in frame[n, n+3], the number of subframes for the relay link is 8, and the ratio of the number of subframes for the relay link to the number of subframes for the access link is 8:32.

If the base station decides to use the relay link subframe shown in FIG. 10b according to the actual conditions, the base station may notify the RN and/or neighboring cell under the base station through a bitmap that takes one frame as a period. That is, bit i (i=0, 1, 2, 3, 4, 5) corresponds to the DL subframe n (n=1, 2, 3, 6, 7, 8) consecutively. In this case, if the information about bitmap that takes one frame as a period is "000101", it indicates that the DL subframe n (n=6, 8) in each frame is used for the relay link, and the corresponding UL subframe (n+4) mod 10=0, 2 is also used for the relay link. The configuration in other periods (1 frame) is the same. The mode of bitmap that takes one frame as a period is applicable when the configuration of the relay link subframe is the same on every frame. In this case, the notification information occupies only 6 bits. The configuration information about the relay link subframe may be notified through a system message, or high-layer configuration information, or RN initialto Alt1 is 4; the maximum number of DL/UL processes of the UE that uses the HARQ timeline corresponding to Alt2 is 8; and the maximum number of DL/UL processes of the relay link is 2.

The DL subframes {1, 2, 3, 7} are all available to the MBMS service of the RN. Supposing that the DL subframes of other base station or RN in the same MBMS service area as the base station or RN available to the MBMS service are DL subframes {2, 3, 6}, the common DL subframes {2, 3} may be configured as the MBSFN subframes available to the MBMS service. In this case, the configuration may be performed through the "one frame bitmap" mode in the LTE.

In the configuration case Alt 2 [option m] (m=0, 2, 6) in Table 9, the system may also select a combination of any 1, 2, or 3 basic patterns in Alt2 option m (m=0, 2, 6) for the relay link, which is not repeated here any further. In order to meet backward compatibility, this configuration case Alt2 option m (m=0, 2, 6) is more suitable for this circumstance: In a period equivalent to frame [n, n+3], the number of subframes available to the UL/DL relay link is not greater than 12.

As shown in FIG. 10c, another embodiment of the present invention is an example of the configuration case "Alt2 option m, m=1, 5, 7" in Table 9. In this case, in a period equivalent to frame [n, n+3], the number of subframes for the relay link is 12, and the ratio of the number of subframes for the relay link to the number of subframes for the access link is 12:28.

Likewise, the system may notify the RN under the base station through a bitmap that takes one frame as a period. The bitmap information "101010" indicates that the DL subframes n (n=1, 3, 7) in each frame is used for the relay link, and the corresponding UL subframe (n+4) mod 10=5, 7, 1 is also used for the relay link. Afterward, the RN may allocate the subframes corresponding to Alt1 option k (k=0, 2, 4, 6) to the R8/9/10-UE according to the relation shown in Table 9. On such subframes, the UEs use the HARQ timeline corresponding to Alt1. The RN may also allocate the subframes corresponding to Alt 2 option k (k=0, 2, 3, 4, 6, 8, 9) to R10-UE. On such subframes, the UEs use the HARQ timeline corresponding to Alt2.

In frame [n, n+3], the maximum number of DL/UL processes of the UE that uses the HARQ timeline corresponding to Alt1 is 4; the maximum number of DL/UL processes of the UE that uses the HARQ timeline corresponding to Alt2 is 7; and the maximum number of DL/UL processes of the relay link is 3.

The DL subframes {2, 6, 8} are all available to the MBMS service of the RN. In this case, the configuration may be performed in a "one frame bitmap" mode.

Likewise, in the configuration case Alt2 option m (m=1, 5, 7) in Table 9, the system may also select a combination of any 1, 2, or 3 basic patterns in Alt2 option m (m=1, 5, 7) for the relay link, which is not repeated here any further. In order to meet backward compatibility, this configuration case Alt2 option m (m=1, 5, 7) is more suitable for this circumstance: In a period equivalent to frame [n, n+3], the number of subframes available to the UL/DL relay link is not greater than 12.

As shown in FIG. 10d, another embodiment of the present invention is an example of the configuration case "Alt2 option m, m=0, 2, 6, 1, 5, 7" in Table 9. In this case, in a period equivalent to frame [n, n+3], the number of subframes for the relay link is 24, and the ratio of the number of subframes for the relay link to the number of subframes for the access link is 24:16.

In this case, if the information about a bitmap that takes one frame as a period is "111111", it indicates that the DL subframe n (n=1, 2, 3, 6, 7, 8) in each frame is used for the relay link, and the corresponding UL subframe (n+4) mod 10=5, 6, 7, 0, 1, 2 is also used for the relay link. According to the relation shown in Table 9, without the basic patterns in Alt1, no subframes of the HARQ timeline exactly compliant with the LTE R8 are available to R8/9-UE. In this case, the UL/DL process of R8/9-UE on the access link subframe may incur losses; however, the subframes corresponding to Alt 2 option k (k=3, 4, 8, 9) may be allocated to R10-UE, and, on such subframes, the UEs use the HARQ timeline corresponding to Alt2.

In frame [n, n+3], the maximum number of DL/UL processes of the UE that uses the HARQ timeline corresponding to Alt2 is 4; and the maximum number of DL/UL processes of the relay link is 6.

In a period equivalent to an integer multiple of one frame, DL subframes except those not configurable as MBSFN subframes are used for the relay link. Such a configuration does not support the MBMS service.

In the configuration case Alt2 option m (m=0, 2, 6, 1, 5, 7) in Table 9, the system may also select a combination of any k (1≤k≤6) basic patterns in Alt2 option m (m=0, 2, 6, 1, 5, 7) for the relay link, which is not repeated here any further.

In order to meet backward compatibility, this configuration scenario Alt2 option m (m=0, 2, 6, 1, 5, 7) is more suitable for this circumstance: In a period equivalent to frame [n, n+3], the number of subframes available to the UL/DL relay link is greater than 12.

As shown in FIG. 10e, in another embodiment of the present invention, four basic patterns Alt2 options {0, 2, 6} and Alt3 {5} are combined for the relay link. It is an example of the configuration case corresponding to index 1 in Table 9, in which three Alt2 basic patterns and one Alt3 basic patterns are combined. In this case, in the period equivalent to frames [n, n+3], the number of subframes used for the relay link is 15, and the ratio of the number of subframes for the relay link to the number of subframes for the access link is 15: 25.

The relay link subframe configuration varies with frames. The configuration may be notified to the RN under the eNB in the mode of a bitmap that takes four frames as a period. In a period equivalent to four frames, the DL/UL subframes are numbered 0, 1, 2, ..., 39. Bit i (i=0, 1, 2, ..., 23) sequentially corresponds to the DL subframe n (n=1, 2, 3, 6, 7, 8, 11, 12, 13, 16, 17, 18, 21, 22, 23, 26, 27, 28, 31, 32, 33, 36, 37, 38) in the four frames. In this case, the information about the bitmap that takes four frames as a period is "110101010111010101011101", which indicates the DL relay link subframe shown in FIG. 10e, and the corresponding UL subframe (n+4) mod M is also used for the relay link, where M is the total number of UL subframes in the period equivalent to an integer multiple of one frame. The mode of the bitmap that takes integer (the integer is greater than one) multiple of one frame as a period is generally applicable when the configuration of the relay link subframe differs between frames. In this case, the notification information occupies only 24 bits.

The base station may also indicate the configuration information through a bitmap of basic patterns. That is, each bit corresponds to a basic pattern to be possibly used for the relay link. The configuration shown in FIG. 10e uses "10100110" to indicate that option i (i=0, 2, 5, 6) is used for the relay link, and therefore, the UL and DL subframes in this basic pattern are used for the relay link. In this case, the notification information involved in the bitmap indication mode of basic patterns occupies only 8 bits. After obtaining the configuration information about the relay link subframes, the RN may allocate the subframes corresponding to Alt1 option k (k=1, 3, 7) to R8/9/10-UE according to the relation shown in Table 9. On such subframes, the UEs use the HARQ timeline corresponding to Alt1. The RN may also allocate the subframes corresponding to Alt 2 option k (k=3, 4, 8, 9) to R10-UE. On such subframes, the UEs use the HARQ timeline corresponding to Alt2.

In frames [n, n+3], the maximum number of DL/UL processes of the UE that uses the HARQ timeline corresponding to Alt1 is 3; the maximum number of DL/UL processes of the UE that uses the HARQ timeline corresponding to Alt2 is 4; and the maximum number of DL/UL processes of the relay link is 4.

In frames [n, n+3], except the DL subframes {0, 4, 5, 9} and the subframes for the relay link, the subframes can be used for the MBMS service of this RN. In this case, the configuration may be performed in a four-frame bitmap mode.

In the configuration case corresponding to index 1 in Table 9, the system may also select a combination of any k (1≤k≤7) basic patterns in Alt 2 [option m] and Alt 3 [option n]; m=0, 2, 6; n=1, 3, 5, 7 for the relay link, which is not repeated here any further.

In consideration of the backward compatibility and complexity of the system, the configuration case corresponding to index 1 in Table 9 is generally applied to Alt 2 options {0, 2, 6} & Alt 3 [option n]; n=1, 3, 5, 7. In this case, in frames [n, n+3], the number of subframes used for the relay link is greater than 12.

Figures 10F, 10G, 10H, 10I:
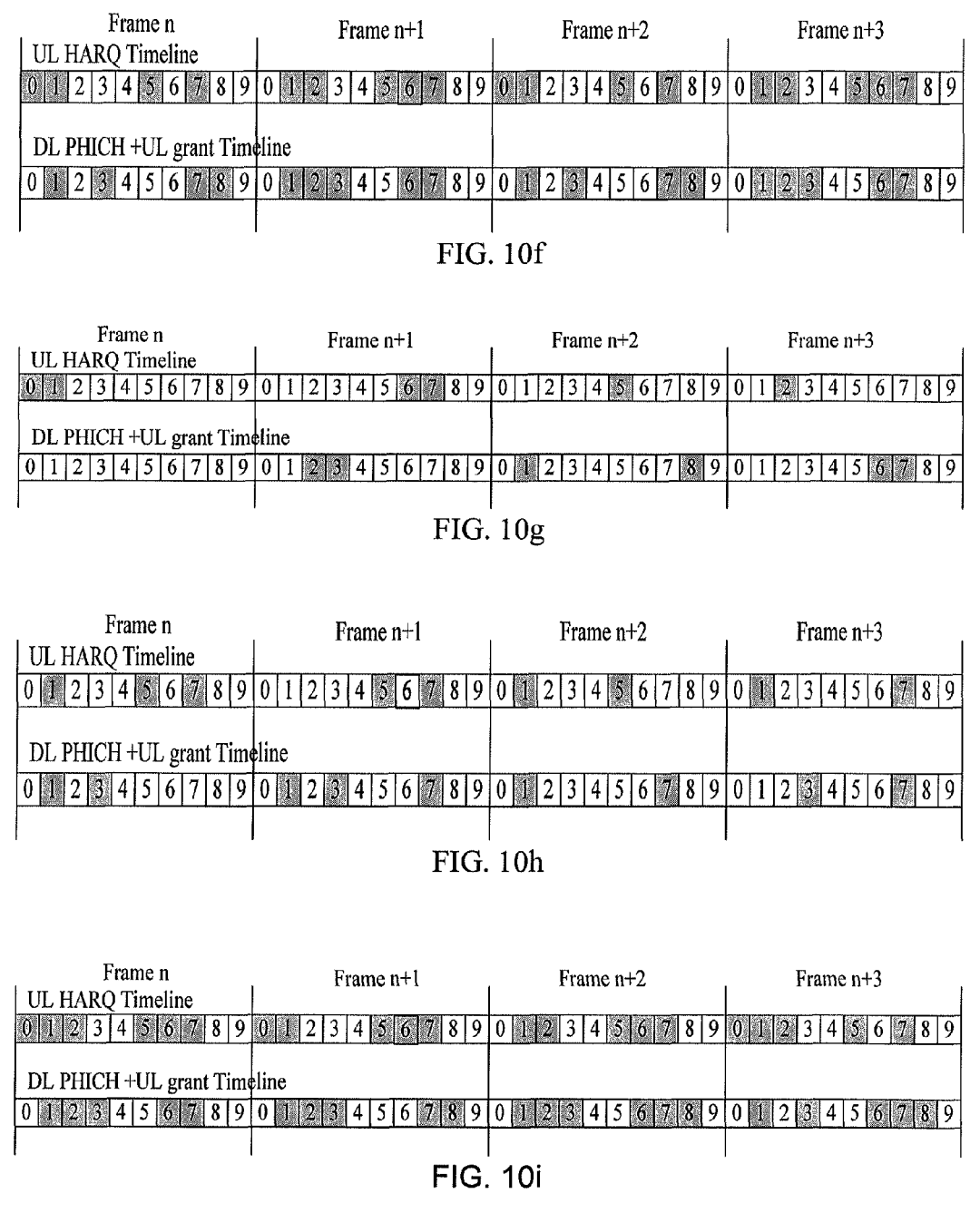

As shown in FIG. 10f, in another embodiment of the present invention, Alt2 options {1, 5, 7} and Alt3 options {0, 4} are used for the relay link. It is an example of the configuration case corresponding to index 2 in Table 9, in which three Alt2 basic patterns and two Alt3 basic patterns are combined. In this case, in frames [n, n+3], the number of subframes used for the relay link is 18, and the ratio of the number of subframes for the relay link to the number of subframes for the access link is 18:22.

If the base station decides to use the relay link subframe shown in FIG. 10f according to its actual conditions, the base station may obtain the configuration information about the relay link subframe in a mode similar to the 4-frame bitmap indication mode above, or an indication mode of the bitmap of basic patterns, and then the RN may allocate the subframes corresponding to AM option k (k=2, 6) to R8/9/10-UE according to the relation shown in Table 9. On such subframes, the UEs use the HARQ timeline corresponding to Alt1. The RN may also allocate the subframes corresponding to Alt 2 option k (k=3, 4, 8, 9) to R10-UE. On such subframes, the UEs use the HARQ timeline corresponding to Alt2.

In frames [n, n+3], the maximum number of DL/UL processes of the UE that uses the HARQ timeline corresponding to Alt1 is 2; the maximum number of DL/UL processes of the UE that uses the HARQ timeline corresponding to Alt2 is 4; and the maximum number of DL/UL processes of the relay link is 5.

In frames [n, n+3], except the DL subframes {0, 4, 5, 9} and the subframes for the relay link, the subframes can be used for the MBMS service of this RN. In this case, the configuration may be performed in a 4-frame bitmap mode.

In the configuration case corresponding to index 2 in Table 9, the system may also select a combination of any k (1≤k≤7) basic patterns in Alt 2 [option m] and Alt 3 [option n]; m=1, 5, 7; n=0, 2, 4, 6 for the relay link, which is not repeated here any further.

In consideration of the backward compatibility and complexity of the system, the configuration case corresponding to index 2 in Table 9 is generally applied to Alt 2 options {1, 5, 7} & Alt 3 [option n]; n=0, 2, 4, 6. In this case, in a period equivalent to frames [n, n+3], the number of subframes used for the relay link is greater than 12, or the number of basic patterns used for the relay link is greater than 3.

As shown in FIG. 10g, in another embodiment of the present invention, Alt3 options {0, 1} are used for the relay link. It is an example of "Alt 3 [option m], & Alt 3 [option n]; m=0, 2, 4, 6; n=1, 3, 5, 7" in case 3 corresponding to index 3 in Table 9, in which two Alt3 basic patterns are combined. In this case, in a period equivalent to frames [n, n+3], the number of subframes used for the relay link is 6, and the ratio of the number of subframes for the relay link to the number of subframes for the access link is 6: 34.

If the base station decides to use the relay link subframe shown in FIG. 10g according to its actual conditions, the base station may obtain the configuration information about the relay link subframe in a mode similar to the 4-frame bitmap indication mode above, or an indication mode of the bitmap of basic patterns, and then the RN may allocate the subframes corresponding to Ala option k (k=2, 4, 6, 3, 5, 7) to R8/9/10-UE according to the relation shown in Table 9. On such subframes, the UEs use the HARQ timeline corresponding to Alt1. The RN may also allocate the subframes corresponding to Alt 2 option k (k=3, 4, 8, 9) to R10-UE. On such subframes, the UEs use the HARQ timeline corresponding to Alt2.

The maximum number of DL/UL processes of the UE that uses the HARQ timeline corresponding to Alt1 is 6; the maximum number of DL/UL processes of the UE that uses the HARQ timeline corresponding to Alt2 is 4; and the maximum number of DL/UL processes of the relay link is 2.

At the head and the end of each UL subframe, the receiving and transmitting state transition time needs to be reserved. If two UL subframes are adjacent, it is only required that the UL subframes {0, 1} in frame n of the two UL subframes are adjacent to each other. Therefore, in a period equivalent to frames [n, n+3], except the DL subframes {0, 4, 5, 9} and the subframes for the relay link, the subframes are available to the MBMS service of the RN. In this case, the configuration may be performed in a four-frame bitmap mode.

In the configuration case corresponding to index 3 in Table 9, the system may also select a combination of any k (1≤k≤8) basic patterns in Alt 3 [option m] and Alt 3 [option n]; m=0, 2, 4, 6; n=1, 3, 5, 7 for the relay link, which is not repeated here any further.

In consideration of the backward compatibility and complexity of the system, the configuration case corresponding to index 3 in Table 9 is generally applied to Alt 3 [option m] and Alt 3 [option n]; m=0, 2, 4, 6; n=1, 3, 5, 7. In this case, in a period equivalent to frames [n, n+3], the number of subframes used for the relay link is greater than 12, or the number of basic patterns used for the relay link is greater than 3.

As shown in FIG. 10h, in another embodiment of the present invention, Alt3 options {1, 5, 7} are used for the relay link. It is an example of "Alt 3 [option m], m=1, 3, 5, 7" in case 2 corresponding to index 3 in Table 9, in which three Alt3 basic patterns are combined. In this case, in a period equivalent to frames [n, n+3], the number of subframes used for the relay link is 9, and the ratio of the number of subframes for the relay link to the number of subframes for the access link is 9: 31.

If the base station decides to use the relay link subframe shown in FIG. 10h according to its actual conditions, the base station may obtain the configuration information about the relay link subframe in a mode similar to the 4-frame bitmap indication mode above, or an indication mode of the bitmap of basic patterns, and then the RN may allocate the subframes corresponding to AM option k (k=0, 2, 4, 6, 3) to R8/9/10-UE according to the relation shown in Table 9. On such subframes, the UEs use the HARQ timeline corresponding to Alt1. The RN may also allocate the subframes corresponding to Alt 2 option k (k=0, 2, 3, 4, 6, 8, 9) to R10-UE. On such subframes, the UEs use the HARQ timeline corresponding to Alt2.

The maximum number of DL/UL processes of the UE that uses the HARQ timeline corresponding to Alt1 is 5; the maximum number of DL/UL processes of the UE that uses the HARQ timeline corresponding to Alt2 is 7; and the maximum number of DL/UL processes of the relay link is 3.

In the period equivalent to frames [n, n+3], except the DL subframes {0, 4, 5, 9} and the subframes for the relay link, the subframes can be used for the MBMS service of this RN. In this case, the configuration may be performed in the "four frame bitmap" mode.

In the configuration mode of Alt 3 [option m], m=1, 3, 5, 7 in case 2 corresponding to index 3 in Table 9, the system may also select a combination of any k (1≤k≤4) basic patterns in Alt 3 [option m] m=1, 3, 5, 7 for the relay link, which is not repeated here any further. The configuration in Alt 3 options {1, 3, 5, 7} is equivalent to the configuration in Alt 2 options {1, 5, 7} in case 2 of index 0.

In the configuration case of Alt 3 [option m], m=0, 2, 4, 6 in Table 9, the system may also select a combination of any k (1≤k≤4) basic patterns in Alt 3 [option m], m=0, 2, 4, 6 for the relay link, which is not repeated here any further. The relay link subframe configuration in Alt 3 options {0, 2, 4, 6} is equivalent to that in Alt 2 options {0, 2, 6} in case 1 of index 0 in Table 9.

As shown in FIG. 10i, in another embodiment of the present invention, the subframes included in Alt3 options {0, 1, 2, 3, 5, 6, 7} are used for the relay link. It is an example of Alt 3 [option m] and Alt 3 [option n]; m=0, 2, 4, 6; n=1, 3, 5, 7 in case 3 in Table 9, in which 7 Alt3 basic patterns are combined. In this case, in a period equivalent to frames [n, n+3], the number of subframes used for the relay link is 21, and the ratio of the number of subframes for the relay link to the number of subframes for the access link is 21: 19.

If the base station decides to use the relay link subframe shown in FIG. 10i according to its actual conditions, the base station may obtain the configuration information about the relay link subframe in a mode similar to the 4-frame bitmap indication mode above, or an indication mode of the bitmap of basic patterns, and then the RN may allocate the subframes corresponding to Alt1 option k (k=4) to R8/9/10-UE according to the relation shown in Table 9. On such subframes, the UEs use the HARQ timeline corresponding to Alt1. The RN may also allocate the subframes corresponding to Alt 2 option k (k=3, 4, 8, 9) to R10-UE. On such subframes, the UEs use the HARQ timeline corresponding to Alt2.

In the configuration mode corresponding to index 3 in Table 9, the system may also select a combination of any k (1≤k≤7) basic patterns in Alt 2 [option m] and Alt 3 [option n]; m=0, 2, 6; n=1, 3, 5, 7 for the relay link, which is not repeated here any further.

In an embodiment of the present invention, the applied configuration modes of relay link subframes are a subset of the configuration modes in Table 9, and are detailed in Table 23.

TABLE 23

| index | for relay link | | for access link |
|---|---|---|---|
| 0 | Alt 2 option 0 | Alt 1 [option k], k = 1, 3, 5, 7 | Alt 2 [option k], k = 2, 4, 6, 8, 1, 3, 5, 7, 9 |
| 1 | Alt 2 option {1, 7} | Alt 1 [option k], k = 0, 2, 4, 6 | Alt 2 [option k], k = 0, 2, 4, 6, 8, 3, 5, 9 |
| 2 | Alt 2 option {0, 2, 6} | Alt 1 [option k], k = 1, 3, 5, 7 | Alt 2 [option k], k = 4, 8, 1, 3, 5, 7, 9 |

TABLE 23-continued

| index | for relay link | | for access link |
|---|---|---|---|
| 3 | Alt 2 option {0, 2, 6, 1} | — 5, 7, 9 | Alt 2 [option k], k = 4, 8, 3, |
| 4 | Alt 2 option {0, 2, 6, 1, 5} | — 3, 7, 9 | Alt 2 [option k], k = 4, 8, |
| 5 | Alt 2 option {0, 2, 6, 1, 5, 7} | — 4, 8, 9 | Alt 2 [option k], k = 3, |

The types in Table 23 are sorted according to the number of basic patterns used for the relay link in ascending order, and essentially, according to the number of UL/DL subframes used for the relay link in ascending order. There is only one definite configuration case of relay link subframes. Any configuration mode of relay link subframes compliant with the definition of this type in Table 9 may be selected. Table 23 gives only an example. In this case, in a period equivalent to an integer (e.g., 4) multiple of one frame, the number of subframes used for the relay link is 4*(index+1), the ratio of the number of subframes for the relay link to the number of subframes for the access link is 4*(index+1):(Nf−4*(index+1)). Nf is equal to the number of UL/DL subframes in a period equivalent to an integer (e.g., 4) multiple of one frame. In the LTE FDD system, Nf is equal to 40. The base station may use three bits to directly indicate the configuration case of the relay link subframes.

The HARQ timeline on the relay link and the access link in Table 11 may be detailed as Table 24.

TABLE 24

| index | | PDSCH VS. UL ACK/NACK (ms) | PUSCH VS. PHICH (ms) | PUSCH VS. PHICH/ UL Grant VS. PUSCH (ms) | UL retransmission period (ms) |
|---|---|---|---|---|---|
| 0 | relay link | 4 | 6 | 4 | 10 |
| | R8/9/10-UE | 4 | 4 | 4 | 8 |
| | R10-UE | 4 | 6 | 4 | 10 |

Evidently, the HARQ timeline on the relay link and the access link is simple and easy to implement in the system.

In an embodiment of the present invention, the applied configuration cases of relay link subframes are a subset of the configuration cases in Table 9, and are detailed in Table 25.

TABLE 25

| index | for relay link | | for access link |
|---|---|---|---|
| 0 | Alt 2 [option m], m = 0, 2, 6 | Alt 1 [option k], k = 1, 3, 5, 7 | Alt 2 [option k], k≠m, k = 0, 1, 2, . . . , 9 |
| | Alt 2 [option m], m = 1, 5, 7 | Alt 1 [option k], k = 0, 2, 4, 6 | Alt 2 [option k], k≠m, k = 0, 1, 2, . . . , 9 |
| 1 | Alt 3 [option m], & Alt 3 [option n]; m = 0, 2, 4, 6; n = 1, 3, 5, 7 | Alt 1 [option k], k≠m, &k≠n; k = 0, 1, 2, . . . , 7 | Alt 2 [option k], k = 3, 4, 8, 9 |
| 2 | Alt 2 [option m], & Alt 2 [option n]; m = 0, 2, 6; n = 1, 5, 7 | — | Alt 2 [option k], k≠m, & k≠n; k = 0, 1, 2, . . . , 9 |

As shown in Table 25, in a period equivalent to an integer multiple (multiples of 4) of one frame, the index=0 configuration case is applied if a condition is met, for example, if the number of DL/UL subframes used for the relay link in 4 frames is less than or equal to 12. The index=1 configuration case is applied if certain conditions are met, for example, if the number of DL/UL subframes used for the relay link in 4 frames is greater than 12 and backward compatibility is required, namely, R8/9-UE is supported without HARQ process loss. The index=2 configuration case is applied if certain conditions are met, for example, if the number of DL/UL subframes used for the relay link in 4 frames is greater than 12 and no backward compatibility is required, namely, some HARQ process loss of the R8/9-UE is acceptable, or no R8/9-UE exists.

The system indicates the configuration case of relay link subframes in Table 25 in the following way:

Header field (1 bit): indicates the HARQ timeline type used for the relay link. If the header field is "1", the HARQ timeline corresponding to "UL HARQ retransmission period is 10 ms" is applied; if the header field is "0", the HARQ timeline corresponding to "UL HARQ retransmission period is an integer multiple of 8 ms" is applied.

The configuration mode corresponding to "index=0, 2" is indicated by "bitmap that takes integer multiple of one frame as a period (1 frame)" (6 bits). Bit i (i=0, 1, 2, 3, 4, 5) corresponds to DL subframe n (n=1, 2, 3, 6, 7, 8) consecutively. If the corresponding DL subframe is used for the relay link and the corresponding UL subframe (n+4) mod 10 is also used for the relay link, bit i is set to "1"; conversely, bit i is set to "0". Moreover, the HARQ timeline corresponding to "UL HARQ retransmission period is 10 ms" is applied on such subframes.

The configuration mode corresponding to index=1 is indicated by "bitmap of basic patterns" (8 bits). That is, a bitmap indicates the basic patterns used for the relay link, bit i (i=0, 1, 2, 3, 4, 5, 6, 7) corresponds to the basic pattern option i (i=0, 1, 2, 3, 4, 5, 6, 7). If the corresponding basic pattern is used for the relay link, bit i is set to "1"; conversely, bit i is set to "0". Moreover, the HARQ timeline corresponding to "UL HARQ retransmission period is an integer multiple of 8 ms" is applied on such subframes.

The configuration mode corresponding to index=1 may also be indicated by "bitmap mode of initial subframes". Each bit i (i=0, 1, 2, 3, 4, 5, 6, 7) in the bitmap corresponds to 8 possible values of the initial subframe number a in the UL HARQ retransmission period consecutively, a={0, 1, 2, . . . , L−1}, L=8. If a bit is set to "1", a may have the corresponding value; if the bit is set to "0", a cannot have the corresponding value. Several values of a are obtained according to the bitmap, and then a group of DL subframes and UL subframes are obtained through the following formula according to each value of the obtained a, and such subframes are used for relay link transmission. Therefore, the subframe number of the DL subframe applied to the relay link is i=(a+k*L) mod M, i mod N≠0, 4, 5, 9; and the subframe number of the UL subframe used for the relay link is j=(i+b) mod M, N=10; M=40, b=4.

The index=1 configuration mode may also be indicated by another simplified mode, namely, "bitmap of basic patterns" (5 bits). That is, bit i, i=0, 1, 2, 3, 4. If i=4 and K=1, it indicates that the four options {0, 2, 4, 6} are all used for the relay link; if K=0, it indicates that the four options {1, 3, 5, 7} are all used for the relay link. The remaining bits (i=0, 1, 2, 3) indicate whether the option k=i*2+K is used for the relay link. If i=1, option k=i*2+K is used for the relay link; conversely, if option k=i*2+K is not used for the relay link, i is set to 0, where k=(i+K)*2, and K is the value of bit i=4.

Evidently, the foregoing notification mode is a combination of "bitmap that takes an integer multiple of one frame as a period" and "bitmap of basic patterns".

The HARQ timeline on the relay link and the access link in Table 11 may be detailed as Table 26:

TABLE 26

| index | | PDSCH VS. UL ACK/NACK (ms) | PUSCH VS. PHICH (ms) | PUSCH VS. PHICH/ UL Grant VS. PUSCH (ms) | UL retransmission period (ms) |
|---|---|---|---|---|---|
| 0, 2 | relay link | 4 | 6 | 4 | 10 |
| | R8/9/10-UE | 4 | 4 | 4 | 8 |
| | R10-UE | 4 | 6 | 4 | 10 |
| 1 | relay link | 4 | 4, 12 | 4 | 8, 16 |
| | R8/9/10-UE | 4 | 4 | 4 | 8 |
| | R10-UE | 4 | 6 | 4 | 10 |

Evidently, the HARQ timeline on the relay link and the access link is simple. Only one type of HARQ timeline exists on the relay link under each configuration, thus facilitating system implementation, and meeting flexible configuration of the relay link subframes, backward compatibility and future network evolution.

The embodiments of the present invention are also applicable to convergence of the LTE network and the LTE-A network. A data transmission method of network nodes is disclosed in an embodiment of the present invention. The network nodes are LTE-A UE and LTE UE. The method includes: selecting subframes in a period equivalent to an integer multiple of one frame in an LTE FDD system, providing services exclusively for the LTE-A UE, and providing services for the LTE UE and the LTE-A UE on the unselected subframes, where: the period includes a basic pattern or a combination of multiple basic patterns, the basic pattern is a group of UL subframes and DL subframes that take an integer multiple of one frame as a period, such subframes meet a specific HARQ timeline, the interval between UL subframes is an UL retransmission period, the interval between the DL subframes is equal to the interval between the UL subframes, the subframe number of an UL subframe is equal to the subframe number of a DL subframe plus an offset, and the offset is an ACK/NACK feedback interval of the DL process on the DL subframe; and performing data transmission according to the selected subframes. This method ensures the unique service scenario of the LTE_A network as against the LTE network. That is, the network can serve both UE_LTE and UE_LTE_A, and provide exclusive services for the UE_LTE_A only, thus converging the LTE network and the LTE-A network effectively.

Figure 11:
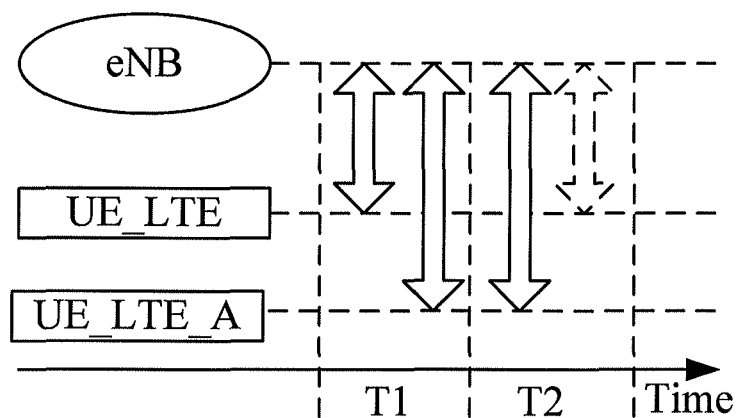
FIG. 11 is a schematic diagram showing transmission modes of eNB, UE_LTE, and UE_LTE_A in a converged network of LTE and LTE-A according to an embodiment of the present invention.

The method may be: the eNB selects some subframes exclusively for the UE_LTE_A, and provide exclusive services for the UE_LTE_A on such subframes; on other subframes, the eNB provide ordinary services for both UE_LTE and UE_LTE_A. The foregoing method of selecting relay link subframe is completely applicable to selecting exclusive subframe for the UE_LTE_A. The detailed method may be: In a converged network of the LTE and the LTE-A, the eNB, the UE_LTE, and the UE_LTE_A communicate with each other in a mode shown in FIG. 11. T2 is an exclusive subframe selected for the UE_LTE_A; and T1 is a remaining subframe for providing services for both UE_LTE and UE_LTE_A. The exclusive subframes of the UE_LTE_A are shown in Table 27:

TABLE 27

| Frame | | | nf | nf + 1 | nf + 2 | nf + 3 |
|---|---|---|---|---|---|---|
| Group x | option0 | UL | 0, 8 | 6 | 4 | 2 |
| | | DL | 4 | 2 | 0, 8 | 6 |
| | option2 | UL | 2 | 0, 8 | 6 | 4 |
| | | DL | 6 | 4 | 2 | 0, 8 |
| | option4 | UL | 4 | 2 | 0, 8 | 6 |
| | | DL | 0, 8 | 6 | 4 | 2 |
| | option6 | UL | 6 | 4 | 2 | 0, 8 |
| | | DL | 2 | 0, 8 | 6 | 4 |
| Group y | option1 | UL | 1, 9 | 7 | 5 | 3 |
| | | DL | 5 | 3 | 1, 9 | 7 |
| | option3 | UL | 3 | 1, 9 | 7 | 5 |
| | | DL | 7 | 5 | 3 | 1, 9 |
| | option5 | UL | 5 | 3 | 1, 9 | 7 |
| | | DL | 1, 9 | 7 | 5 | 3 |
| | option7 | UL | 7 | 5 | 3 | 1, 9 |
| | | DL | 3 | 1, 9 | 7 | 5 |
| Others | | | Above combination (option i + option j) | | | |

Table 27 reveals that all options in FIG. 3 and combination of the options can serve as exclusive subframes of the UE_LTE_A. For each option, the LTE FDD HARQ timeline relation is met.

For the UE_LTE, the eNB schedules DL data on DL subframe n, n□{0, 4, 5, 9}. The scheduling comes in two cases, as detailed in Table 28:

Case 1: The eNB schedules DL data for the UE_LTE, and the UE_LTE needs to return an UL ACK/NACK to the eNB on the UL subframe n+4.

Case 2: The eNB does not schedule DL data for the UE_LTE, and the UE_LTE does not need to return an UL ACK/NACK to the eNB on the UL subframe n+4.

TABLE 28

| | | subframe n + 4 | |
|---|---|---|---|
| UL | subframe n − 4 | Case 1 | Case 2 |
| LTE-A UE_LTE_A->eNB | ○ | ○ | ○ |
| LTE UE_LTE->eNB | X | ○ | X |

| | subframe n | | |
|---|---|---|---|
| DL | Case 1 | Case 2 | subframe n + 8 |
| LTE-A eNB->UE_LTE_A | ○ | ○ | ○ |
| LTE eNB->UE_LTE | DL data scheduled to UE_LTE | DL data not scheduled to UE_LTE | X |

Note
X means that the link is disabled; and
○ means that the link is enabled.

Nevertheless, if the LTE-A UE can use the HARQ timeline different from the LTE UE, it may also use the subframe selection mode shown in Table 9, except that the subframes used for the relay link are provided for the LTE-A UE as subframes that provide LTE-A exclusive services, and the subframes corresponding to the AM basic patterns are provided for the LTE UE. Moreover, collision of the HARQ process is prevented between the LTE UE and the LTE-A UE. If the configuration mode shown in Table 29 is applied, collision of the HARQ process exists between the LTE UE and the LTE-A UE. In this case, the colliding processes may be discriminated by discriminating the UE.

TABLE 29

| for LTE-A UE | for LTE UE |
|---|---|
| Alt 2 [option m], m = 0, 1, 2 . . . 9 | Alt 1 [option k], k = 0, 1, 2, . . . 9 |

The embodiments of the present invention meet the LTE FDD constraint between the UE_LTE and the eNB, prevent impact on the communication of the UE_LTE, and accomplish effective convergence between the LTE network and the LTE-A network.

Meanwhile, the embodiments of the present invention are also a method of processing smooth evolution from the LTE to the LTE-A. According to the method provided herein, some subframes in the LTE network are selected for providing exclusive services for the UE_LTE_A in the LTE-A network as against the LTE network.

Figure 12:
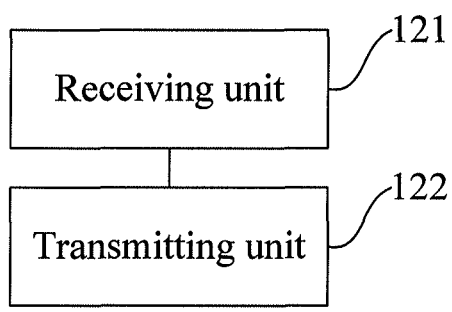
FIG. 12 shows a structure of a network node according to an embodiment of the present invention.

FIG. 12 shows a structure of a network node in an embodiment of the present invention. The network node includes:

a receiving unit 121, configured to: receive information about relay link subframe, the relay link subframe is configured in subframes in a period equivalent to an integer multiple of one frame, where the relay link subframe takes on a specific HARQ timeline; and a transmitting unit 122, configured to perform relay link transmission in the relay link subframe determined according to the relay link subframe information received by the receiving unit.

The network node provided in an embodiment of the present invention can execute the method provided in the foregoing embodiments. The configuration of the relay link subframes in this embodiment has been described above in the foregoing method embodiments.

After reading the foregoing embodiments, those skilled in the art are clearly aware that the present invention may be implemented through hardware, or through software in addition to a necessary universal hardware platform. Therefore, the technical solution under the present invention may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present invention.

The above descriptions are merely some exemplary embodiments of the present invention, but not intended to limit the scope of the present invention. Any modifications or variations that can be derived by those skilled in the art should fall within the scope of the present invention.

What is claimed is:

1. A relay transmission method, comprising:
receiving, by a relay node, configuration information about a relay link subframe, wherein the relay link subframe is configured according to at least one basic pattern periodically in a period equivalent to four frames, each frame includes 10 subframes, wherein the basic pattern includes downlink (DL) subframes and uplink (UL) subframes, and wherein an interval between the UL subframes is one of 8 ms or 16 ms and a interval between the DL subframes is one of 8 ms or 16 ms; and
performing, by the relay node, relay link transmission on the relay link subframe, wherein the maximum number of hybrid automatic repeat request (HARQ) processes on a relay link is equal to the number of basic patterns in the period equivalent to four frames, wherein a subframe number of a UL subframe included in the basic pattern=(a subframe number of a DL subframe included in the basic pattern+4) mod 40.

2. The method of claim 1, wherein:
downlink (DL) relay link subframe in the relay link subframe is configured as Multicast Broadcast Single-Frequency Network (MBSFN) subframe.

3. The method according to claim 1, wherein the relay link transmission performed on the relay link subframe comprises:
sending UL data on relay link subframe n; and
receiving Acknowledgement (ACK)/Nonacknowledgement (NACK) information on relay link subframe n+k, wherein n is an integer and k is 4, 6, or 12.

4. The method according to claim 1, further comprising:
on relay link subframe n+j, retransmitting the UL data sent on relay link subframe n, wherein n is an integer, j=L*K, L is a natural number, and K is equal to 8 or 10.

5. The method of claim 4, wherein:
if the UE is R10 UE, the LTE R10 UE is configured on the subframes compliant with a special timeline, and the subframes compliant with the special timeline comprise DL subframes corresponding to broadcast channel, DL subframes corresponding to synchronization channel, or DL subframes corresponding to paging channel, or any combination thereof; and/or
the subframes compliant with the special timeline comprise UL subframes, and the HARQ processes in the UL subframes configured with special timeline take on an UL retransmission period equivalent to the integer multiple of one frame, or an UL retransmission period that is the same as the R8/R9 UE.

6. The method according to claim 1, further comprising:
receiving DL data on relay link subframe m, and sending Acknowledgement (ACK)/Nonacknowledgement (NACK) information on relay link subframe m+4, wherein m is an integer; or
receiving an UL Grant instruction or ACK/NACK information on relay link subframe p, and adjusting an UL data channel on relay link subframe p+4, wherein p is an integer.

7. The method of claim 1, wherein:
a maximum number of DL Hybrid Automatic Repeat Request (HARQ) processes of a data channel of a relay link is equal to the number of a DL relay link subframe in the frame; and
a maximum number of Uplink (UL) HARQ processes of a data channel of the relay link is equal to the number of a UL relay link subframe in the frame.

8. The method of claim 1, wherein:
a maximum number of DL HARQ processes of a data channel of a relay link is equal to the number of basic pattern used for the relay link in the integer multiple of one frame, or the number of DL subframe groups used for the relay link in the integer multiple of one frame; and
a maximum number of UL HARQ processes of the data channel of the relay link is equal to the number of basic pattern for the relay link in the integer multiple of one frame, or the number of the UL subframes for the relay link in the integer multiple of one frame.

9. The method according to claim 1, wherein:
the configuration information further comprises a validity period, and the validity period indicates time effectiveness of the configuration information and is equal to the integer multiple of one frame; or
the configuration information is indicated by a base station at intervals, and each of the intervals is equal to the integer multiple of one frame.

10. The method according to claim 1, further comprising:
indicating the configuration information about the relay link subframe in a bitmap mode.

11. The method of claim 10, wherein:
at least one DL subframe in the period equivalent to the integer multiple of one frame corresponds to a bit, the bit indicates whether the corresponding DL subframe is used for relay link transmission, and the number of bits indicated in the bitmap mode is equal to the number of DL subframes in the integer multiple of one frame except the subframes corresponding to broadcast channel, synchronization channel, and paging channel.

12. The method of claim 11, wherein:
the UL subframes for relay link transmission are obtained according to a subframe number of the DL subframe for relay link transmission, the subframe number of the UL subframe=(the subframe number of the DL subframe+ an offset) mod M, M is a natural number that represents the number of all DL subframes or UL subframes in the integer multiple of one frame.

13. The method of claim 1, wherein:
each basic pattern or DL subframe group corresponds to a bit, and this bit indicates whether the corresponding basic pattern or DL subframe group is used for relay link transmission.

14. The method of claim 13, wherein:
the number of bits is equal to the number of the basic patterns or DL subframe groups in a period equivalent to the integer multiple of one frame.

15. The method according to claim 1, wherein:
non-relay link subframes in the integer multiple of one frame are configured for User Equipment served by a Relay Node (RN), and User Equipment (UE) may be a Long Term Evolution (LTE) Revision 8 (R8) system UE, and/or an LTE R9 UE, and/or an LTE R10 UE.

16. The method of claim 15, wherein: if the LTE R10 UE has a special UL HARQ timeline different from the LTE R8 UE, the method further comprises:
scheduling the LTE R10 UE on a channel for sending UL data on subframes, or a channel for receiving Acknowledgement (ACK)/Nonacknowledgement (NACK) on subframe s+6; and/or
by the LTE R10 UE, on subframe n+j, retransmitting the UL data sent on subframe n, wherein j=L*K, L is a natural number, and K is equal to 10.

17. The method of claim 1, wherein:
an Uplink (UL) Hybrid Automatic Repeat Request (HARQ) configured in the relay link subframe is synchronous HARQ or asynchronous HARQ.

18. A network node, comprising:
a receiving unit, configured to: receive information about relay link subframe, where the relay link subframe is configured according to at least one basic pattern periodically in a period equivalent to four frames, each frame includes 10 subframes; wherein the basic pattern includes downlink (DL) subframes and uplink (UL) subframes, wherein an interval between the UL subframes is one of 8 ms or 16 ms and a interval between the DL subframes is one of 8 ms or 16 ms; and
a transmitting unit, configured to perform relay link transmission on the relay link subframe determined according to the relay link subframe information received by the receiving unit, wherein the maximum number of Hybrid Automatic Repeat Request, HARQ, processes on a relay link is equal to the number of basic patterns for the relay link in the period equivalent to four frames, wherein a subframe number of a UL subframe included in the basic pattern=(a subframe number of a DL subframe included in the basic pattern+4) mod 40.

* * * * *